(12) United States Patent
Yamaguchi et al.

(10) Patent No.: US 8,099,802 B2
(45) Date of Patent: Jan. 24, 2012

(54) FLUSH TOILET EQUIPMENT

(75) Inventors: Shigeyuki Yamaguchi, Daito (JP);
Hitoshi Kitamura, Kyotanabe (JP);
Yasunari Maeda, Ibaraki (JP); Takaya Niu, Moriguchi (JP); Kazumasa Rokushima, Nishinomiya (JP);
Yoshihiro Ito, Otsu (JP); Naoki Shibata, Hirakata (JP); Noriyuki Kitachi, Neyagawa (JP); Masato Suzuki, Osaka (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 861 days.

(21) Appl. No.: 11/996,903

(22) PCT Filed: Jul. 26, 2006

(86) PCT No.: PCT/JP2006/314783
§ 371 (c)(1),
(2), (4) Date: Jun. 16, 2008

(87) PCT Pub. No.: WO2007/013518
PCT Pub. Date: Feb. 1, 2007

(65) Prior Publication Data
US 2010/0146693 A1 Jun. 17, 2010

(30) Foreign Application Priority Data

Jul. 26, 2005 (JP) .................................. 2005-216380
Feb. 23, 2006 (JP) .................................. 2006-047408

(51) Int. Cl.
*E03D 1/00* (2006.01)

(52) U.S. Cl. .......................................................... 4/300
(58) Field of Classification Search ....................... 4/300
See application file for complete search history.

(56) References Cited

U.S. PATENT DOCUMENTS 7,225,478 B2 * 6/2007 Lim et al. ........................... 4/313

FOREIGN PATENT DOCUMENTS

| JP | 56-62593 A | 5/1981 |
|---|---|---|
| JP | 01-235738 A | 9/1989 |
| JP | 02-112774 U | 9/1990 |
| JP | 06-085476 U | 12/1994 |
| JP | 11-148162 A | 6/1999 |
| JP | 2000-160645 A | 6/2000 |
| JP | 2001-090145 A | 4/2001 |
| JP | 2002-088880 A | 3/2002 |
| JP | 2002-285620 A | 10/2002 |

(Continued)

OTHER PUBLICATIONS

Supplementary European Search Report for the Application No. EP 06 78 1695 from European Patent Office dated Sep. 10, 2010.

(Continued)

*Primary Examiner* — Charles Phillips
(74) *Attorney, Agent, or Firm* — Cheng Law Group, PLLC

(57) ABSTRACT

Flush toilet equipment comprises a bowl, a flush mechanism that supplies flush water to the bowl through a flush water passage, and a minute bubble generator. The minute bubble generator generates minute bubbles. The bubbles are 0.1-1000 μm in bubble diameter and mixed with the flush water. In this construction, since the minute bubbles are fully diffused into the flush water, various effects such as improvement of toilet flush effect, etc. can be further enhanced.

10 Claims, 18 Drawing Sheets

FOREIGN PATENT DOCUMENTS

JP        2004-100451 A     4/2004

OTHER PUBLICATIONS

Notification of Reasons for Refusal for the Application No. 2007-526877 from Japan Patent Office mailed Jul. 8, 2008.

International Search Report for the Application No. PCT/JP2006/314783 mailed Oct. 24, 2006.

Notification of Reasons for Refusal for Application No. 2008-230185 from Japan Patent Office mailed Jun. 28, 2011.

* cited by examiner

FLUSH TOILET EQUIPMENT

TECHNICAL FIELD

The invention relates to flush toilet facilities and more particularly to flush toilet equipment that includes bubbles in flush water.

BACKGROUND ART

This sort of flush toilet equipment is disclosed in, for example, the patent document of Japanese Patent Application Publication Number 2002-88880, or the like. The equipment displays various effects such as improvement of toilet flush effect, reduction of flush water volume, prevention of water splash, reduction of water splashing sound and so on.

However, in the conventional flush toilet equipment, flush water is included with the bubbles that are, for example, comparatively large millimeter order in bubble diameter, and accordingly the above-mentioned various effects cannot be fully displayed. Because the bubbles of millimeter order are not fully diffused into flush water.

DISCLOSURE OF THE INVENTION

It is therefore an object of the present invention to fully diffuse bubbles into flush water to further enhance various effects such as improvement of toilet flush effect and so on.

Flush toilet equipment of the present invention comprises a bowl; a flush mechanism that supplies flush water to the bowl through a flush water passage; and a minute bubble generator that generates minute bubbles. The bubbles are 0.1-1000 μm in bubble diameter and mixed with the flush water. In this construction, since the minute bubbles are fully diffused into the flush water, various effects such as improvement of toilet flush effect and so on can be further enhanced.

The generator may include a sudden pressure change part that generates the minute bubbles by suddenly changing the pressure of water that is water from a water supply line and includes gas from another line. In this construction, the minute bubbles can be generated without employing, for example, a drive mechanism.

The generator may comprise a gas mixer, a dissolution part, and a separation part as said sudden pressure change part that are arranged between the water supply line and the flush water passage. The gas mixer mixes the gas from said another line with the water from the water supply line to supply gas-mixed water to the dissolution part. The dissolution part dissolves a part or all of the gas of the gas-mixed water into the water to supply gas-dissolved water to the separation part. The separation part suddenly changes the pressure of the gas-dissolved water to separate and generate the minute bubbles from the gas-dissolved water. In case of this construction, it is possible to generate minute bubbles that are extremely minute and high in uniformity.

The generator may comprise a gas mixer, and a shear part as said sudden pressure change part that are arranged in this order from the water supply line to the flush water passage. The gas mixer mixes the gas from said another line with the water from the water supply line to supply gas-mixed water to the shear part. The shear part suddenly changes the pressure of the gas-mixed water to shear the gas of the gas-mixed water and thereby generates the minute bubbles from the gas-mixed water. In case of this construction, pressure loss can be reduced.

The flush toilet equipment may further comprise a bubble diameter controller that controls the generator to adjust diameters of bubbles included in the flush water. In this case, the bowl drains water in case of toilet flush and puts therein water from the mechanism after the toilet flush. In case of the toilet flush, the controller controls the generator so that diameters of bubbles included in the flush water become larger than those of the minute bubbles. In case that the bowl collects the water from the mechanism after the toilet flush, the controller also controls the generator so that the bubbles included in the flush water become the minute bubbles smaller than the bubbles. In this construction, it is possible to enhance the toilet flush effect to lengthen duration of prevention effect of dirt.

The generator may comprise a gas mixer that mixes the gas from said another line with the water from the water supply line to supply gas-mixed water to the sudden pressure change part side. In this case, the controller adjusts the diameters of bubbles included in the flush water by adjusting quantity of the gas mixed with the water from the water supply line. In this construction, diameters of the minute bubbles can be adjusted by utilizing the relationship between a gas quantity and an average diameter of minute bubbles.

The generator may further comprise a vortex generator that rotates the water from the water supply line to the sudden pressure change part side. In this case, the gas mixer supplies the gas from said another line to the neighborhood of the rotation center of the water rotated through the vortex generator. In this construction, gas can be mixed in water through the ejector effect. Therefore, the equipment can be simplified.

The generator may further comprise an air pump located between the water supply line and the gas mixer. In this case, the controller adjusts the diameters of bubbles included in the flush water by adjusting output of the air pump to adjust quantity of the gas mixed with the water from the water supply line. In this construction, quantity of gas mixed with water can be accurately adjusted.

The flush toilet equipment may further comprise at least one of a chemical liquid injector and a sterilizer that are located between the water supply line and the sudden pressure change part. In this construction, if flush water is injected with, for example, a surface active agent as the chemical liquid, the surface tension of the gas-mixed water can be reduced, and generation of the minute bubbles can be promoted. If flush water is injected with, for example, an aromatic as the chemical liquid, distinctive aromatic effect can be provided for a toilet room (bathroom) in addition to suppression of a bad smell. The sterilizer is also provided and thereby sterilization and antibacterial effects can be obtained and a toilet can be kept clean.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

Figure 1:
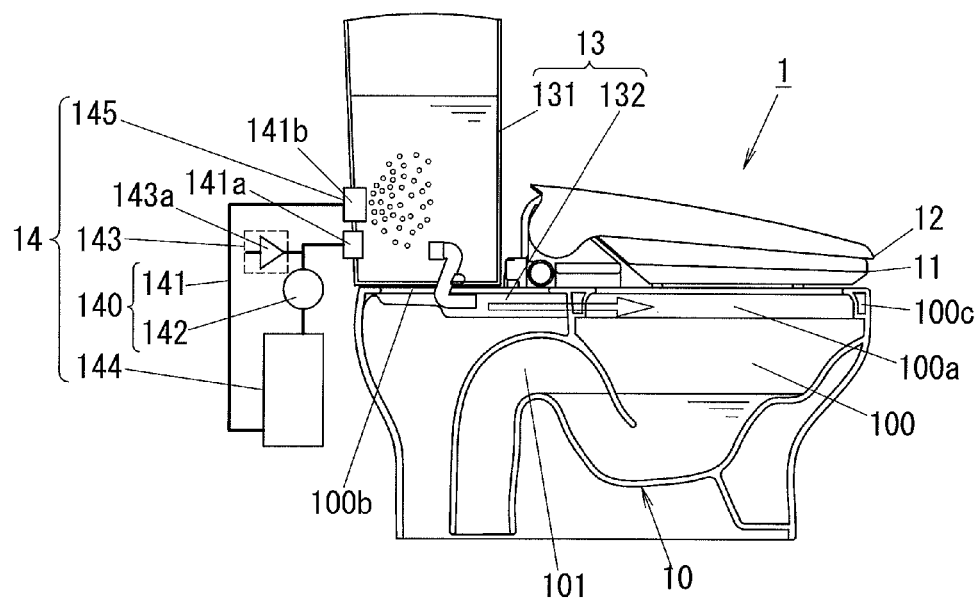
FIG. 1 is a schematic diagram of a first embodiment according to the present invention.

FIG. 1 shows a first embodiment according to the present invention (i.e., flush toilet equipment 1). The equipment 1 has a toilet bowl 10, a seat 11, a seat cover 12, a flush mechanism 13 and a minute bubble generator 14.

The toilet bowl 10 is formed of, for example, vitreous china, resin or the like. The bowl has a receptacle 100 having a loading surface 100b adjacent to the surface of its opening 100a, and a (e.g., siphon jet type) trap 101 located between the inside of the receptacle 100 and a drainpipe (not shown). The receptacle 100 puts therein a small amount of water which is enough to form an air trap through the trap 101. That is, the trap 101 is provided as a means for storing water in the receptacle 100. The seat 11 is mounted on the opening 100a openably and closably, while the seat cover 12 is mounted on the seat 11 openably and closably.

The flush mechanism 13 is formed of, for example, a low tank 131 and a flush water passage 132, and supplies flush water to the bowl 10 (receptacle 100) through the passage 132. The tank 131 is coupled with a water supply line (not shown), and stores a water (running water) from the line through a float valve and so on. The passage 132 is attached to the bowl 10 so that the inlet of the upper stream end is located at the bottom of the tank 131, and the outlet of the lower stream end of the passage 132 is trained on the rim 100c inside the receptacle 100. Therefore, the water in the tank 131 is drained as flush water from the outlet of the passage 132 into the receptacle 100, directly or through the rim of the receptacle 100.

The minute bubble generator 14 has a circulation part 140 that is formed of a circulation passage 141 having both ends coupled to the tank 131, and a pump 142 located between both the ends of the passage 141. The pump 142 is a drive source of the whole minute bubble generator 14. For example, the pump is activated with a human body sensor switch or a switch such as a manual switch, etc. and sucks water from the inlet 141a of one end of the passage 141 to push it outward from the outlet 141b of the other end of the passage 141. Thereby, the water in the tank 131 is circulated through the passage 141.

The generator 14 further has a gas mixer 143, a dissolution part 144, and a sudden pressure change part 145 as a separation part that are arranged in this order from the inlet 141a to the outlet 141b.

The gas mixer 143 is formed of a valve 143a connected with a gas supply source (e.g. ambient atmosphere such as air in a toilet room (bathroom), etc.) through another line, and an ejector mechanism (not shown). The mixer mixes the gas (e.g., air) from said another line with the water from the water supply line to supply gas-mixed water to the dissolution part 144. The valve 143a is a non-return valve, and allows gas to pass from said another line into passage 141, while preventing backward flow of water from the passage 141 to said another line. The ejector mechanism is a negative pressure generator such as a restriction or the like formed in the passage 141, and this generator is coupled with the output of the valve 143a. Therefore, the gas is naturally drawn into the passage 141 through the ejector effect obtained from the water flow in the passage 141. However, not limited to this structure, the gas of the gas supply source may be pushed into the passage 141 compulsorily through an air pump or the like.

Figure 2:
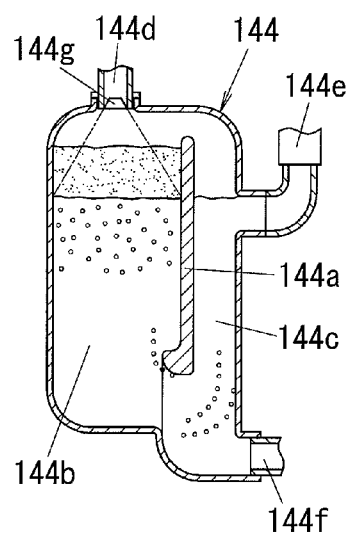
FIG. 2 is a sectional view of a dissolution part in FIG. 1.

The dissolution part 144 includes said pump 142 as the component. The dissolution part dissolves a part or all of the gas of the gas-mixed water in the water under high pressure by the pump 142, and then supplies gas-dissolved water to the sudden pressure change part 145. Specifically, as shown in FIG. 2, the dissolution part 144 is a dissolver (dissolution tank). The dissolver has: a primary tank (bubbling tank) 144b and a secondary tank (water level sensing tank) 144c divided through a partition 144a; an inlet 144d formed at the upper part of the primary tank 144b; and a vent 144e and an outlet 144f respectively formed at the upper part side and lower part of the secondary tank 144c. The tanks 144b and 144c are connected to each other through a gas back-flow hole of the upper part and a water passage hole of the lower part. The inlet 144d includes a spray nozzle 144g, and creates bubbling condition by high-speed spray of the gas-mixed water pushed in from the pump 142 toward the primary tank 144b. Thereby, a part of the gas of the gas-mixed water is dissolved in the water in the dissolver before reaching the outlet 144f through the water passage hole, and gas-dissolved water is supplied to the sudden pressure change part 145 through the passage 141. On the other hands, the remaining part of the gas rises in the secondary tank 144c, and is then returned into the primary tank 144b through the gas back-flow hole or exhausted outward through the vent 144e. In this case, excess gas is exhausted outward through the vent 144e and accordingly the water level in the dissolver is kept constant.

Figure 3:
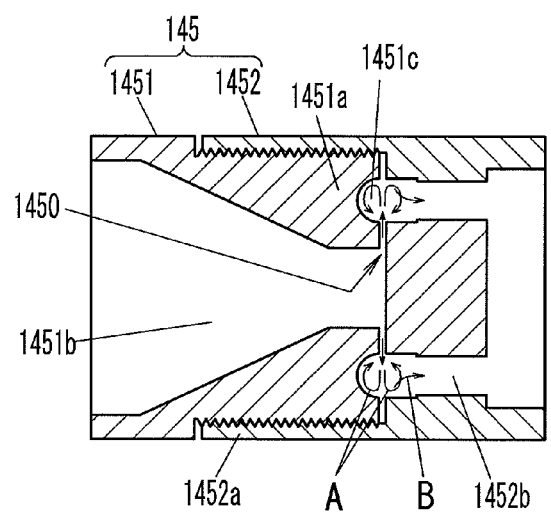
FIG. 3 is a sectional view of a sudden pressure change part in FIG. 1.

The sudden pressure change part 145 is located at the outlet 141b of the circulation passage 141, and suddenly changes the pressure of the gas-dissolved water to separate and generate minute bubbles from the gas-dissolved water. The minute bubbles are 0.1-1000 μm in bubble diameter and are mixed with the flush water. For example, the sudden pressure change part 145 is a special shaped nozzle, and is assembled by screwing a threaded projection 1451a of the outlet side of an upstream member 1451 in a threaded hole 1452a of the inlet side of a downstream member 1452. The upstream member 1451 has a truncated cone shaped hole 1451b whose bottom is located at the inlet, and a groove 1451c that has a semicircular cross section and is formed on the end face of the outlet side. The downstream member 1452 is formed into a shape such as a cylinder of a revolver (gun), which has holes 1452b (e.g., 6 holes), and each hole 1452b is faced to the groove 1451c. A minute gap (minute passage) 1450 is also formed between the end face of the outlet side of the upstream member 1451 and the end face of the center part of the downstream member 1452. The region in the groove 1451c side of the outlet of the gap 1450 becomes a vortex generation region. In this structure, the pressure of the gas-dissolved water is suddenly reduced at the gap 1450 and then the gas produces decompression boiling, so that said minute hubbies are separated from the gas-dissolved water. Subsequently, as shown in the arrow "A" of FIG. 3, vortexes generate at the vortex generation region. As shown in the arrow "B" of FIG. 3, only homogeneous minute bubbles that are less than 21 μm in bubble diameter are supplied from the outlet of the sudden pressure change part 145 to the tank 131. Specifically, since the flow speed of the center part of the vortexes is slower than that of the circumferential part of the vortexes, the pressure of the center part becomes lower than that of the circumferential part. Consequently, bubbles having smaller bubble diameters gather at the circumferential part, while bubbles having larger bubble diameters gather at the center part. Bubbles less than a given diameter at the circumferential part are continuously supplied into the tank 131 from the circumferential part of the vortexes together with flush water. On the other hand, bubbles at the center part collide to each other, so that bubbles having large diameters are collected at the center part. But the vortexes have shear force through the speed slope in the radial direction, and accordingly the bubbles having large diameters are sheared into small bubbles through the shear force when moving to the circumferential part by the centrifugal force. Therefore, in case of this structure, it is possible to stably generate minute bubbles that are at least 0.1-1000 μm in bubble diameter (preferably less than 210 μm). In addition, diameters of minute bubbles are decided by angular velocity of the vortexes in the vortex generation region, and become smaller as the angular velocity is faster. Accordingly, diameters of minute bubbles can be set to a desired diameter by adjusting the flow speed from the gap 1450 to the region.

Thus, minute bubbles are mixed with flush water, and thereby capable of obtaining effects such as improvement of bowl flushing effect, reduction of flushing water volume, prevention of water splash onto the bowl caused by flush water, reduction of water splashing sound and so on. That is, since the minute bubbles are diffused in all over flush water to stay for a long time, a large quantity of minute bubbles can be collide with the inside of the bowl together with flush water. At this point, the minute bubbles remove dirt in the bowl through destructive power owing to collision against the bawl and ultrasonic waves generated by decay. The minute bubbles also have adhesion characteristic (Marangoni effect, etc.) on the interfaces, and accordingly stick to dirt to remove the dirt. Moreover, the minute bubbles stick to suspension substances and then rise and separate. Also, the surfaces of minute bubbles are negatively charged, and thereby the minute bubbles electrostatically stick to suspension substances to wrap them. The effects of the prevention of water splash and the reduction of water splashing sound are obtained by decrease of frictional resistance between flush water and the totality of the minute bubbles. Since the minute bubbles stay in flush water for a long time in comparison with conventional bubbles, apparent bulk specific gravity can be stably reduced and flush water volume can be decreased. The minute bubbles are diffused in all over flush water and accordingly the whole flush water can be clouded and a desirable visual effect is obtained.

Figure 4:
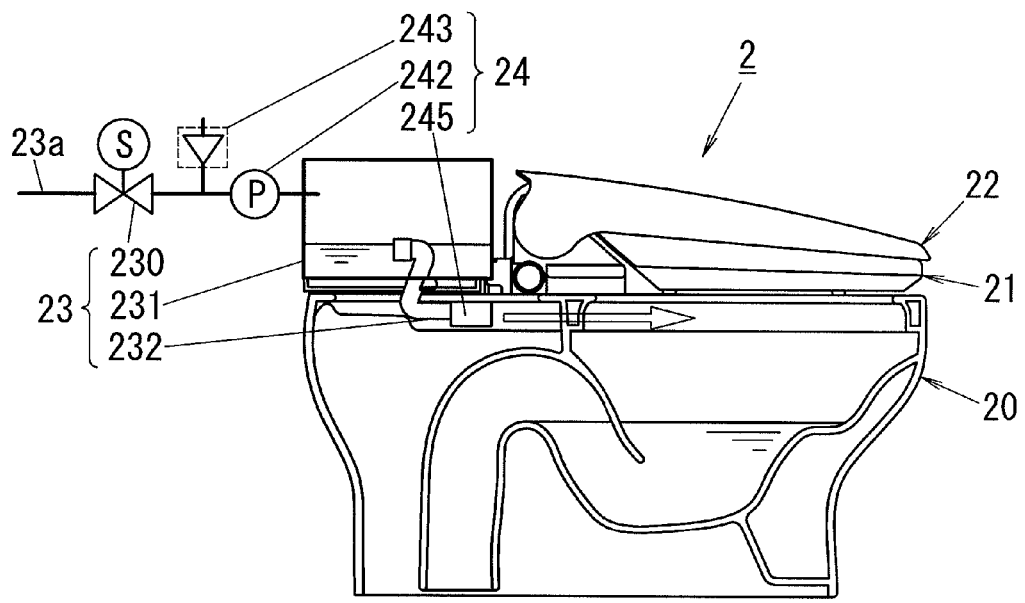
FIG. 4 is a schematic diagram of a second embodiment according to the present invention.

FIG. 4 shows a second embodiment according to the present invention (i.e., flush toilet equipment 2). The equipment 2 has a toilet bowl 20, a seat 21 and a seat cover 22 in the same way as those of the first embodiment. In addition, according to an aspect, the equipment 2 has a flush mechanism 23 and a minute bubble generator 24.

The flush mechanism 23 is formed of, for example, a water supply valve 230, a shallow tank 231 and a flush water passage 232, and supplies flush water to the bowl 20 through the passage 232. The valve 230 is a supply valve (tap) formed of a solenoid valve. The valve is coupled with a water supply line 23a and supplies the tank 231 with the water from the line 23a. The tank 231 stores the water from the valve 230. The passage 232 is attached to the bowl 20 so that the inlet of the upper stream end is located at the bottom of the tank 231, and the outlet of the lower stream end is trained on the rim of the bowl 20. The mechanism 23 also includes a pump 242 described later as the component. The pump 242 presses the water from the valve 230 to send it to the bowl 20 through the tank 231 and the passage 232. On the other hand, the tank 231 also is used as the component of the minute bubble generator 24.

The minute bubble generator 24 has a gas mixer 243, a pump 242, said tank 231 as a dissolution part, and a sudden pressure change part 245 as a separation part that are arranged in this order from the water supply valve 230 to the flush water passage 232. The dissolution part dissolves the gas of the gas-mixed water from the gas mixer 243 in the water of the dissolution part under high pressure by the pump 242, and then supplies gas-dissolved water to the sudden pressure change part 245. The sudden pressure change part 245 is formed in the same way as that of the first embodiment, and located at the outlet of the lower stream end of the passage 232. Thus, the tank is utilized as the dissolution part, and thereby the circulation passage 141 can be omitted.

Figure 5:
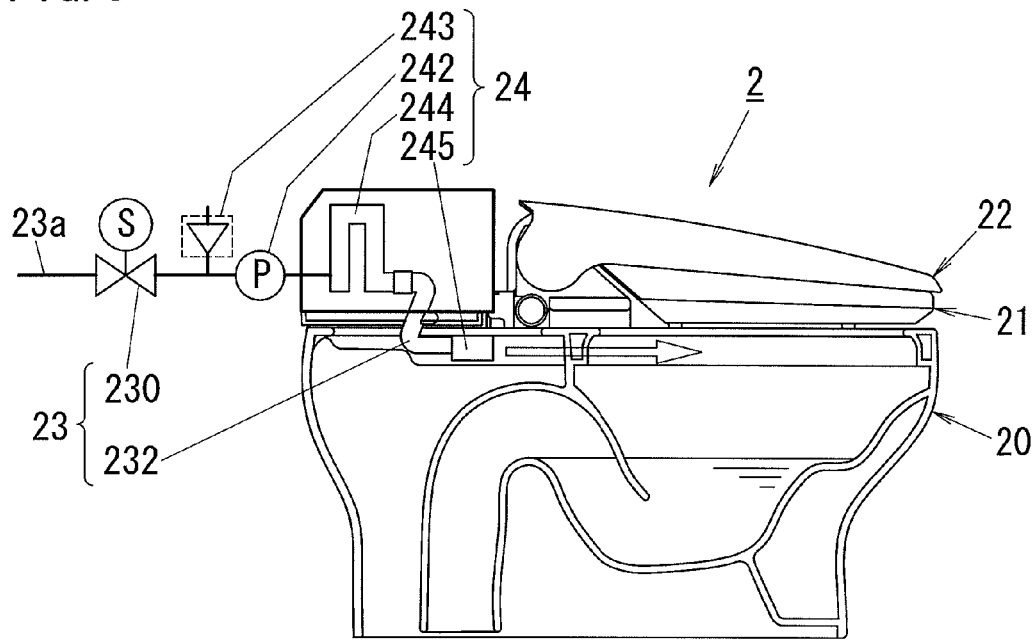
FIG. 5 is a schematic diagram of an alternate embodiment.
Figure 6A:
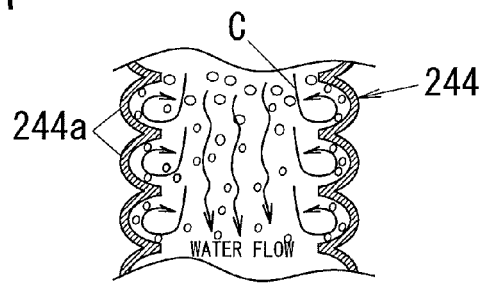
FIG. 6A is a sectional view of a dissolution part in FIG. 5.
Figure 6B:
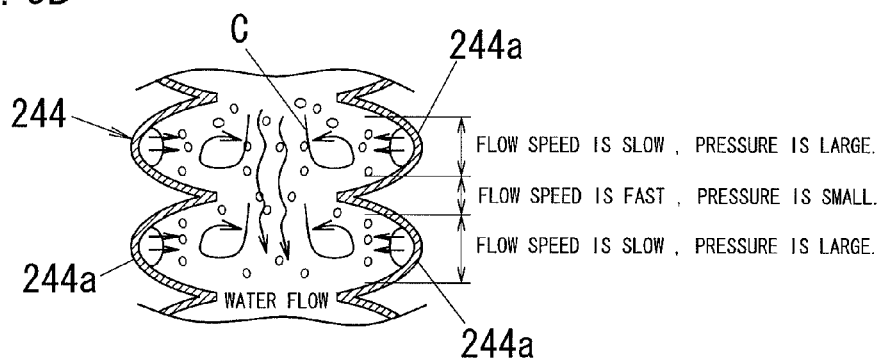
FIG. 6B is a sectional view of the dissolution part in FIG. 5.

In an alternate embodiment, as shown in FIG. 5, the flush toilet equipment 2 has a tubular dissolution part 244 instead of the tank 231. As shown in FIGS. 6A and 6B, the dissolution part 244 is formed into a bellows (accordion) shape, and has continuous resistance parts 244a for suddenly changing pressure and flow speed. Each resistance part 244a has a C-shaped cross section of which center part projects outward, and forms a C-shaped cavity as seen from the inside of the resistance part 244a. When the gas-mixed water from the pump 242 is pressed to enter the dissolution part 244, the gas-mixed water hits against the lower stream side of each cavity of the resistance parts 244a and is then rotated and stirred as shown in "C" of FIGS. 6A and 6B. Thereby, the gas-mixed water is frequently stirred and mixed under high pressure. At the same time, the gas-mixed water flowing in the dissolution part 244 frequently receives pressure change from each resistance part 244a. That is, in the neighborhood of each border of the resistance parts 244a, the flow speed of the gas-mixed water becomes fast, and the pressure of the gas-mixed water becomes lower. Conversely, in the neighborhood of each center of the resistance parts 244a, the flow speed of the gas-mixed water becomes slow, and the pressure of the gas-mixed water becomes high. Accordingly, the gas of the gas-mixed water can be preferably dissolved in the water. The undissolved gas also collects at each bottom of the cavities that are slow in flow speed, but is effectively dissolved in the gas-mixed water that is rotated and stirred under higher pressure. The equipment 2 can be also downsized. Moreover, it is possible to produce minute bubbles that are extremely minute and high in uniformity, because the pressure of the gas-dissolved water after pressurization and dissolution is reduced through the sudden pressure change part 245.

Figure 7:
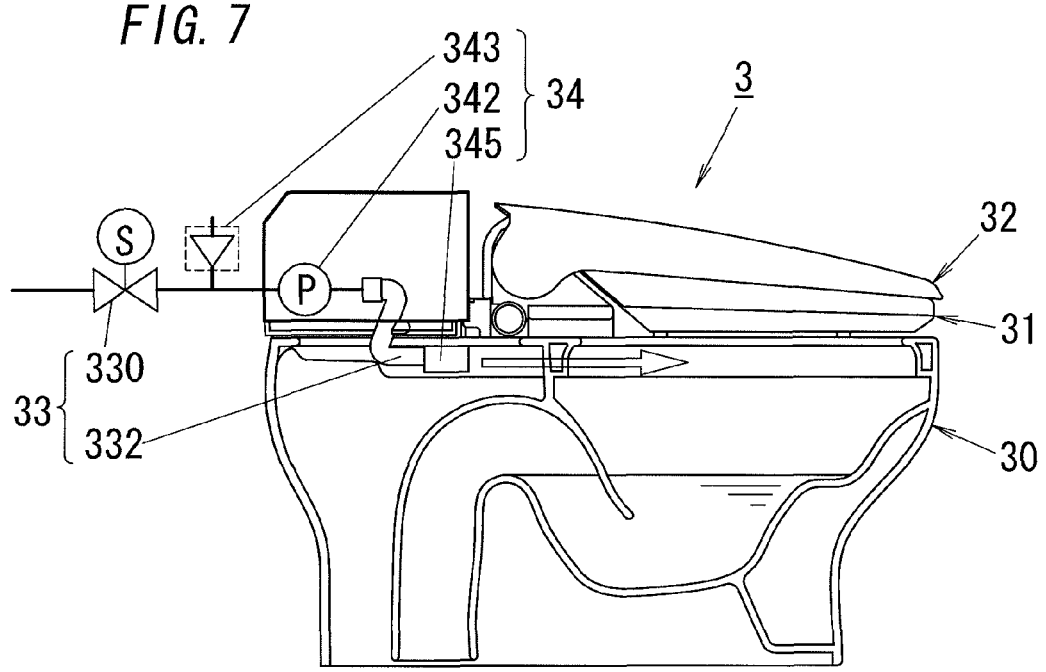
FIG. 7 is a schematic diagram of a third embodiment according to the present invention.

FIG. 7 shows a third embodiment according to the present invention (i.e., flush toilet equipment 3). The equipment 3 has a toilet bowl 30, a seat 31, a seat cover 32, and a flush mechanism 33 formed of a water supply valve 330 and a flush water passage 332, in the same way as those of the second embodiment. In addition, according to an aspect, the equipment 3 has a minute bubble generator 34.

Figure 8:
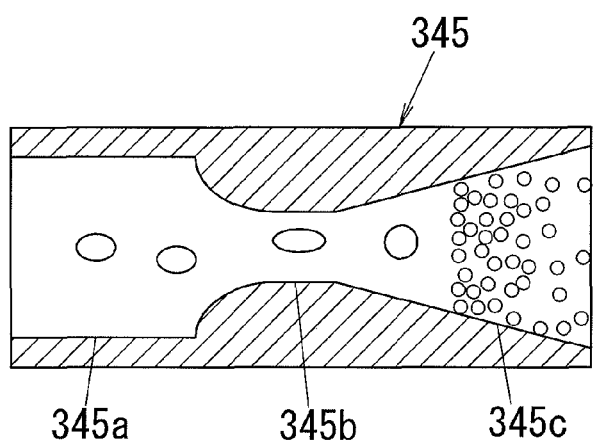
FIG. 8 is a sectional view of a sudden pressure change part in FIG. 7.

The minute bubble generator 34 has a gas mixer 343, a pump 342, and a sudden pressure change part 345 as a shear part that are arranged in this order from the water supply valve 330 to the flush water passage 332. The gas mixer 343 and pump 342 are the same as those of the second embodiment, but the dissolution part is not included. Also as shown in FIG. 8, the sudden pressure change part 345 is formed of a venturi tube, and located at the outlet of the lower stream end of the passage 332. Specifically, from the upper stream side to the lower stream side, the sudden pressure change part 345 has: a cylindrical hole 345a; a throat 345b of which diameter is smaller than both the sides; and a frustum-shaped hole 345c of which bottom is located at the lower stream end. At the throat 345b, the flow speed of the gas-mixed water from the pump 342 becomes fast and the pressure of the gas-mixed water becomes low, and accordingly the gas of the gas-mixed water expands. Subsequently at the hole 345c, the pressure of the gas is continuously increased, and accordingly the gas is continuously shrunk. At this point, the gas receives shear force to be divided into minute bubbles that are 100-500 μm in bubble diameter. In case of this construction, the equipment 3 can be simplified in comparison with said each equipment having a sudden pressure change part as a separation part.

In an enhanced embodiment, the minute bubble generator 34 has a mesh at the lower stream side of the sudden pressure change part 345. In this construction, since flush water including minute bubbles pass through the mesh, the diameters of the minute bubbles can be further decreased. For example, it is possible to produce minute bubbles that are several tens μm in diameter (preferably 30-90 μm). Also in order to produce flush water including minute bubbles less than a given diameter, the sudden pressure change part 345 may have a vortex generation region at the lower stream side in the same way as the sudden pressure change part 145.

Figure 9:
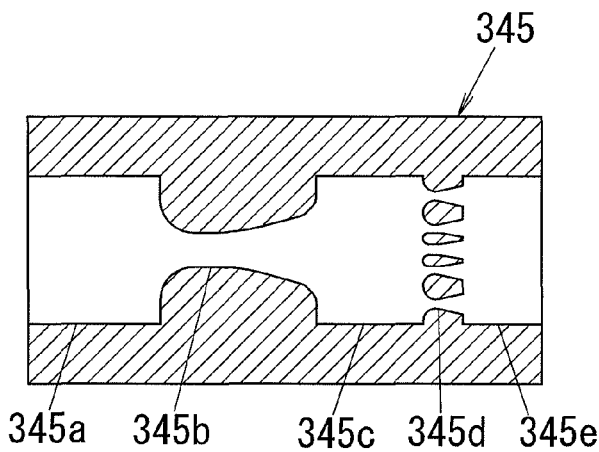
FIG. 9 is a sectional view of a sudden pressure change part in a modified embodiment.

In a modified embodiment, as shown in FIG. 9, the flush toilet equipment 3 has a sudden pressure change part 345 having a plurality of throats. That is, from the upper stream side to the lower stream side, the sudden pressure change part 345 has: a cylindrical hole 345a; a throat 345b; a cylindrical hole 345e; a modified throat 345d formed of a plurality of holes (diverging passages); and a cylindrical hole 345e. In other words, the throat 345b is formed of a venturi tube, while the modified throat 345d is formed of a plurality of venturi tubes. The whole passage cross section of the modified throat 345d is also set to be equal to the passage cross section of the throat 345b. Each passage cross section (diameter) of the modified throat 345d is set based on diameters of minute bubbles. For example, each passage cross section (diameter) of the modified throat 345d forming four diverging passages is set to ¼ (½) of that of the throat 345b, or the like. In the structure of FIG. 8, there is a case that minute bubbles gather at a spot to be joined and thereby become large bubbles. In this embodiment, generation of such large bubbles can be prevented through the modified throat 345d.

Figure 10:
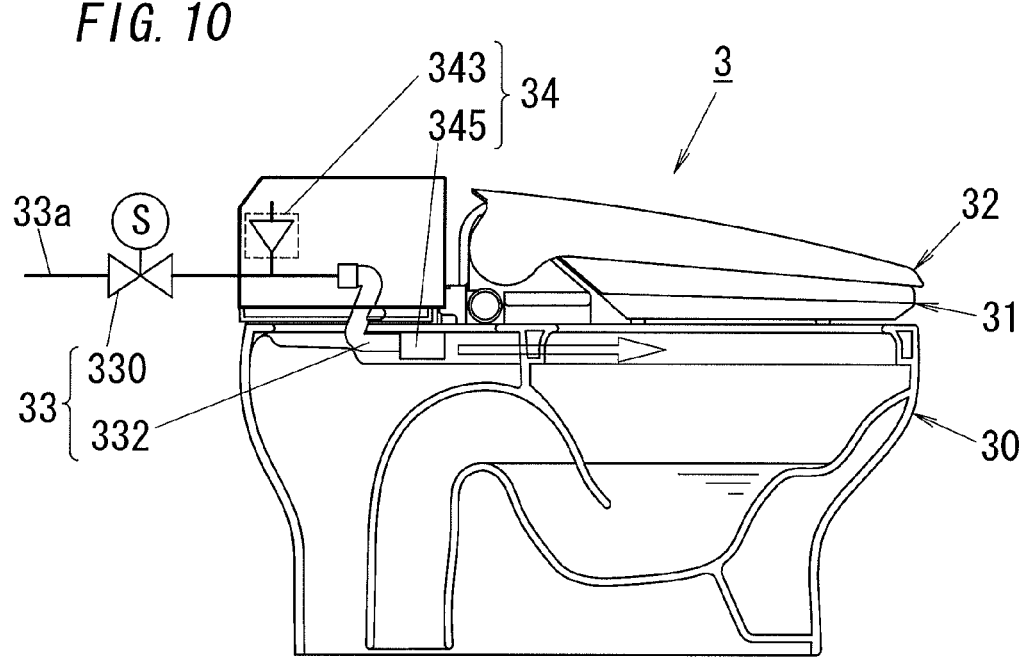
FIG. 10 is a schematic diagram of another modified embodiment.

In another modified embodiment, as shown in FIG. 10, the flush toilet equipment 3 employs the pressure of the water supply line 33a instead of the pump 342. In the equipment 3 having the sudden pressure change part 345 as the shear part, a power-driven source of high power output is nor required. Therefore, if the pressure of the water supply line 33a is more than a given level, the pressure of the water supply line 33a can be employed instead of the pump 342. In case of this embodiment, the equipment 3 can be further simplified.

Figure 11:
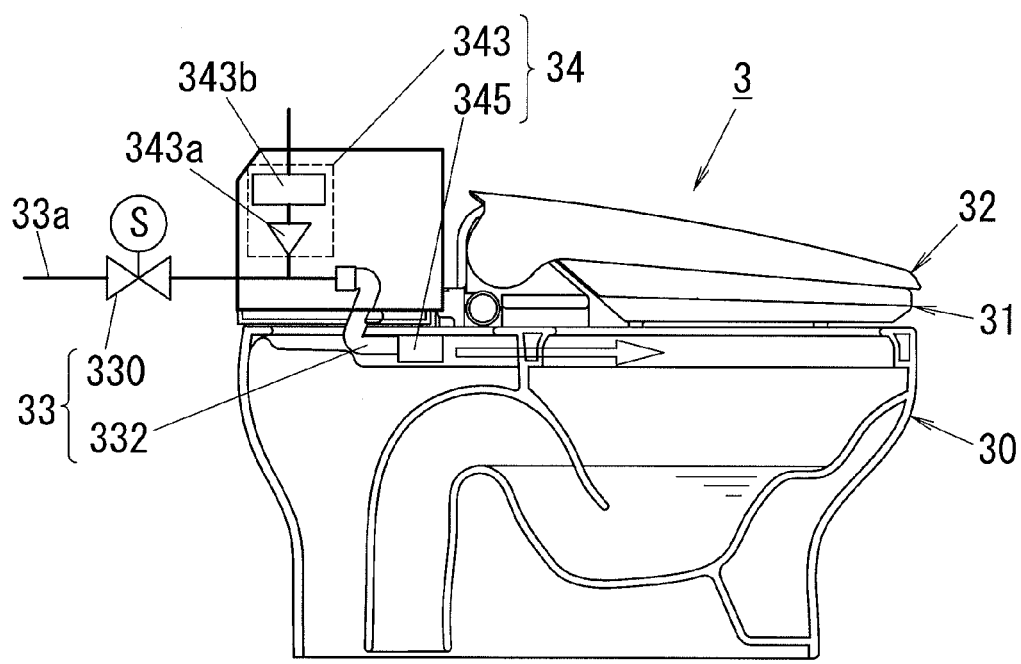
FIG. 11 is a schematic diagram of another modified embodiment.

As shown in FIG. 11, the gas mixer 343 may have a high voltage discharger 343b for generating ozone at the input side of the valve 343a. In this case, since gas including ozone is mixed with the water from the water supply line 33a through the gas mixer 343, minute bubbles including ozone can be drained into the bowl 30 together with flush water. The minute bubbles have high specific surface area and internal pressure, and disperse into the water without rising immediately. Accordingly, by including ozone in the minute bubbles, it is possible to cause ozone to effectively come into contact with flush water physical objects such as dirt, bowl and so on. High sterilizing effect and organic matter breakdown effect can be also obtained through strong oxidation of ozone. Accordingly, more effective toilet flush becomes possible, and it is possible to remove dirt, urine deposits and slime and to prevent them from sticking to the bowl surface in addition to sterilization and microbial control of the whole inside of bowl.

Figure 12:
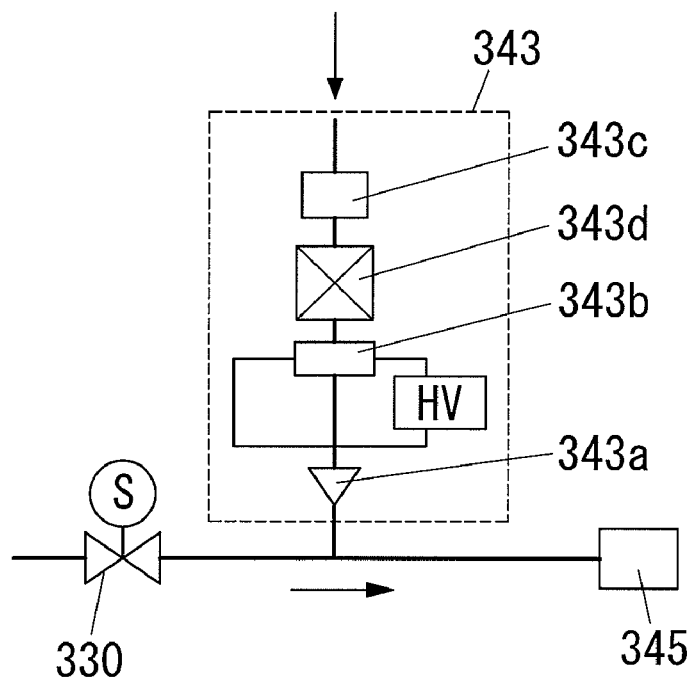
FIG. 12 is a block diagram of a gas mixer in another modified embodiment.

As shown in FIG. 12, the gas mixer 343 may further have a moisture absorption part 343c and an oxygen enrichment film 343d that are arranged in this order from the gas supply source (e.g., ambient atmosphere) to the high voltage discharger 343b. The moisture absorption part 343c includes silica gel for moisture absorption, and so on. The oxygen enrichment film 343d is a filter on which oxygen is carried, and gives gas oxygen and then raises oxygen density in the gas. In case that the gas is air, the oxygen density is raised in a range of 21-40%. Thus, the gas dehumidified through the moisture absorption part 343c is supplied to the oxygen enrichment film 343d, and oxygen density of the gas to the high voltage discharger 343b is raised through the film 343d and thereby the discharger 343b can efficiently generate ozone. Accordingly, sterilization effect can be further enhanced. Incidentally, the high voltage discharger, etc. can be also applied to, for example, the construction of after-mentioned FIG. 17.

Figure 13:
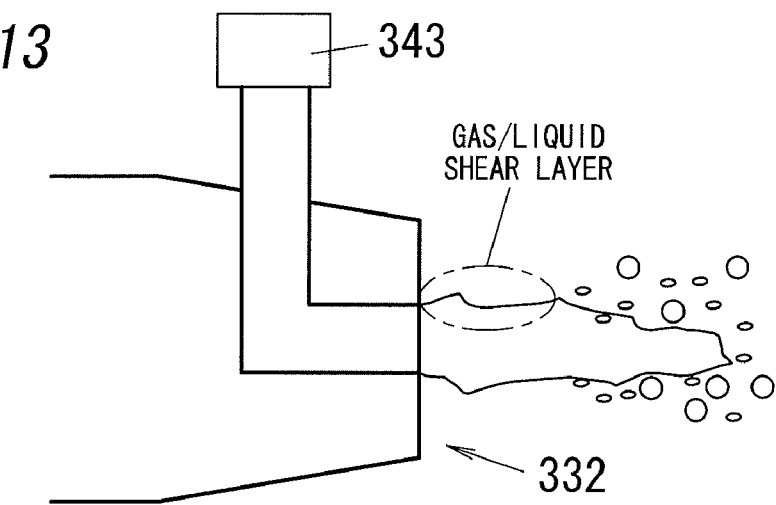
FIG. 13 is a schematic diagram of a shear part in other modified embodiment.

In other modified embodiment, as shown in FIG. 13, the flush toilet equipment 3 has another shear part instead of said sudden pressure change part 345. This shear part generates shear force between the gas from the output of the gas mixer 343 and the water in the flush water passage 332, and then shears the gas. Consequently, minute bubbles generate from the gas. For example, the shear part is formed of the restriction of the flush water passage 332, etc. and converts the flow in the flush water passage into a jet stream, and the gas mixer 343 supplies the gas directly to the neighborhood of the shear part. In this case, since shear force generates at the interface (gas/liquid shear layer) between the gas and water (flush water) of the jet stream, minute bubbles can be produced.

Figure 14:
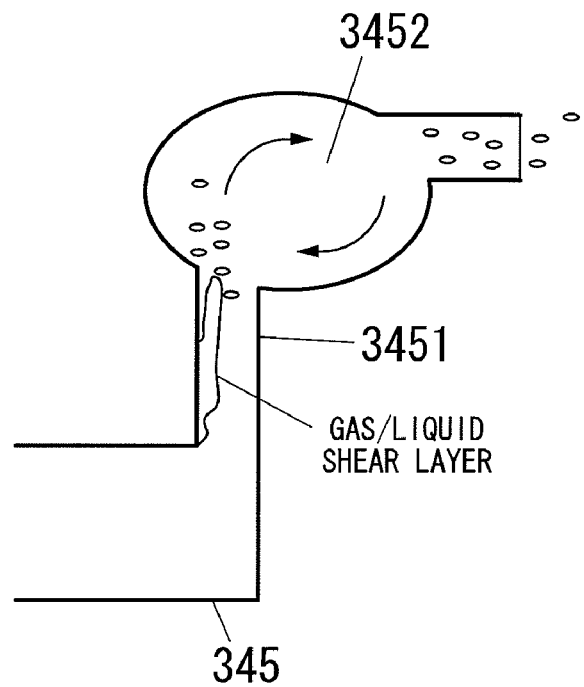
FIG. 14 is a schematic diagram of another shear part.

As shown in FIG. 14, the flush toilet equipment 3 may also have another shear part 345 in stead of said sudden pressure change part 345. This shear part 345 includes a minute passage 3451 and a vortex generation region 3452 in the same way as the gap 1450 and the vortex generation region of FIG. 3, respectively. However, not limited to this, the shear part 345 may have one of the minute passage 3451 and the region 3452. The shear part 345 generates shear force at the interface (gas/liquid shear layer) between the gas of the gas-mixed water in the minute passage 3451 (gas collective) and the water through speed slope in the cross section direction. Thereby, the gas is sheared and then minute bubbles are generated. Subsequently, the region 3452 also generates shear force through speed slope between the center part of the region 3452 and the circumferential part, and thereby shears the gas and the minute bubbles to produce minute bubbles more preferably. In case of these constructions of FIGS. 13 and 14, pressure loss can be more reduced.

Figure 15:
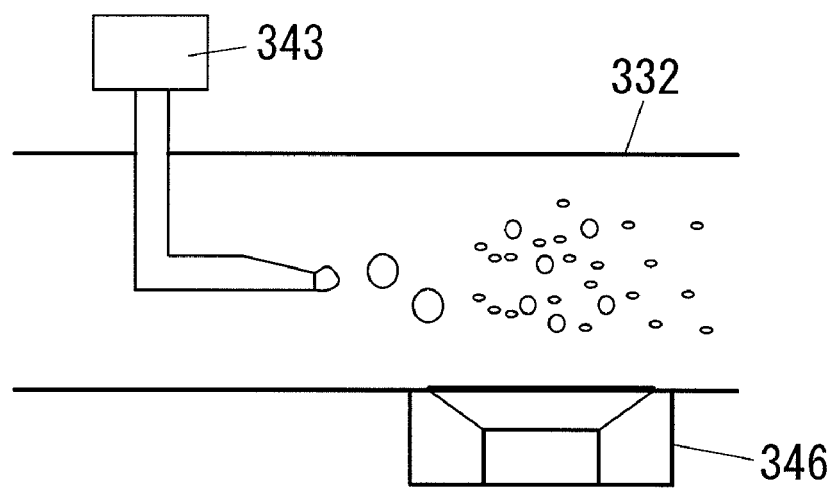
FIG. 15 is an arrangement drawing of an ultrasonic vibrator in other modified embodiment.

In other modified embodiment, as shown in FIG. 15, the flush toilet equipment 3 has an ultrasonic vibrator 346 located at the flush water passage 332 instead of the sudden pressure change part 345. The ultrasonic vibrator 346 transmits ultrasonic vibration to the gas of the gas-mixed water in the flush water passage 332, and fines the gas at the standing wave region to generate minute bubbles. In this embodiment, pressure loss is almost zero, and also diameters of the minute bubbles can be controlled by changing the ultrasonic frequency.

Figure 16A:
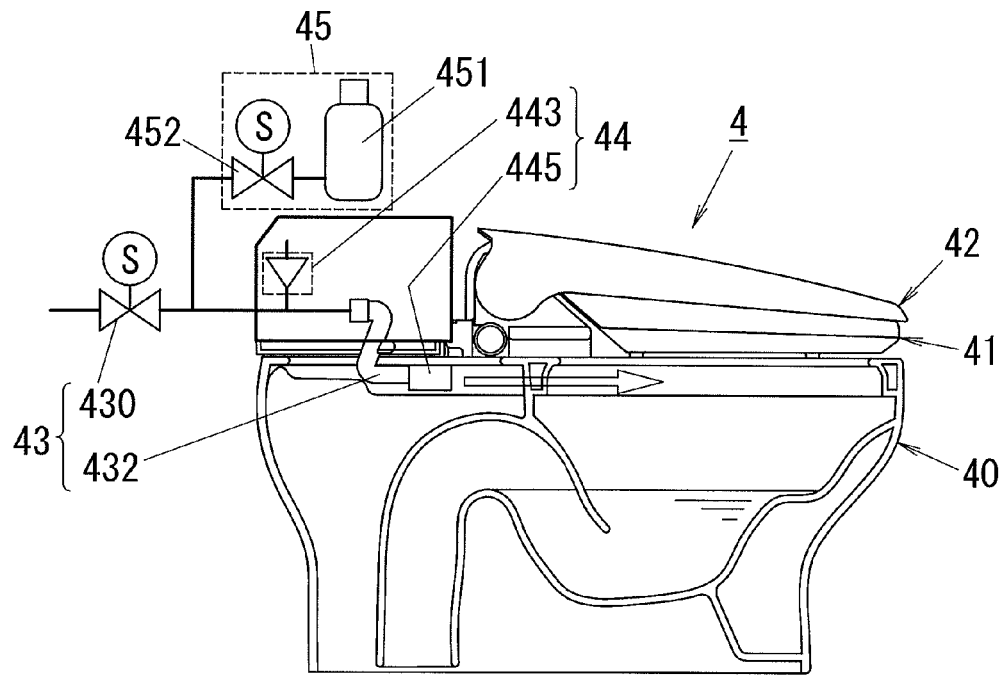
FIG. 16A is a schematic diagram of a fourth embodiment according to the present invention.
Figure 16B:
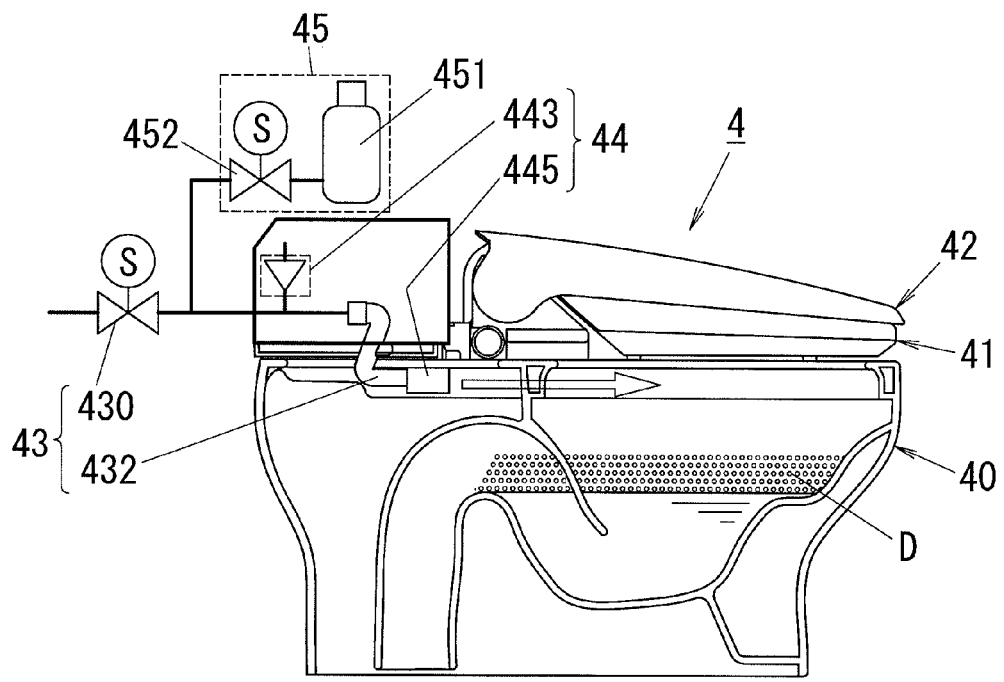
FIG. 16B is a schematic diagram of the fourth embodiment.

FIGS. 16A and 16B show a fourth embodiment according to the present invention (i.e., flush toilet equipment 4). The equipment 4 has: a toilet bowl 40; a seat 41; a seat cover 42; a flush mechanism 43 formed of a water supply valve 430 and a flush water passage 432; and a minute bubble generator 44 formed of a gas mixer 443 and a sudden pressure change part 445 as a shear part, in the same way as those of the embodiment of FIG. 10. In addition, according to an aspect, the equipment 4 further has a chemical liquid injector 45.

The chemical liquid injector 45 is formed of a tank 451 storing a chemical liquid, and a chemical liquid supply valve 452 located at the outlet of the tank 451. The injector injects a given quantity (e.g., 0.5 mL per time) of chemical liquid into the water passage between the water supply valve 430 and the gas mixer 443. The tank 451 stores, for example, a surface active agent. The valve 452 operates in synchronization with the valve 430.

In case of this equipment 4, since the surface active agent is injected into the upper stream of the flush water passage 432, the surface tension of the gas-mixed water can be lowered and generation of minute bubbles can be prompted. In addition, the surface active agent can be included in the interfaces of minute bubbles and accordingly preferable toilet flush becomes possible. As shown in FIG. 16B, a minute bubble layer D can be also formed on the surface of the water in the bowl, because the minute bubbles become hard to burst and disappear even if rising on the surface of the water in the bowl. Thereby, a bad smell and water splash can be prevented.

In an alternate embodiment, the tank 451 stores an aromatic. In this embodiment, since the aromatic is injected into flush water, a bad smell can be decreased and moreover effective aromatic effect can be provided for a toilet room. However, not limited to this, the chemical liquid supply valve 452 may inject both of the surface active agent and the aromatic.

Figure 17:
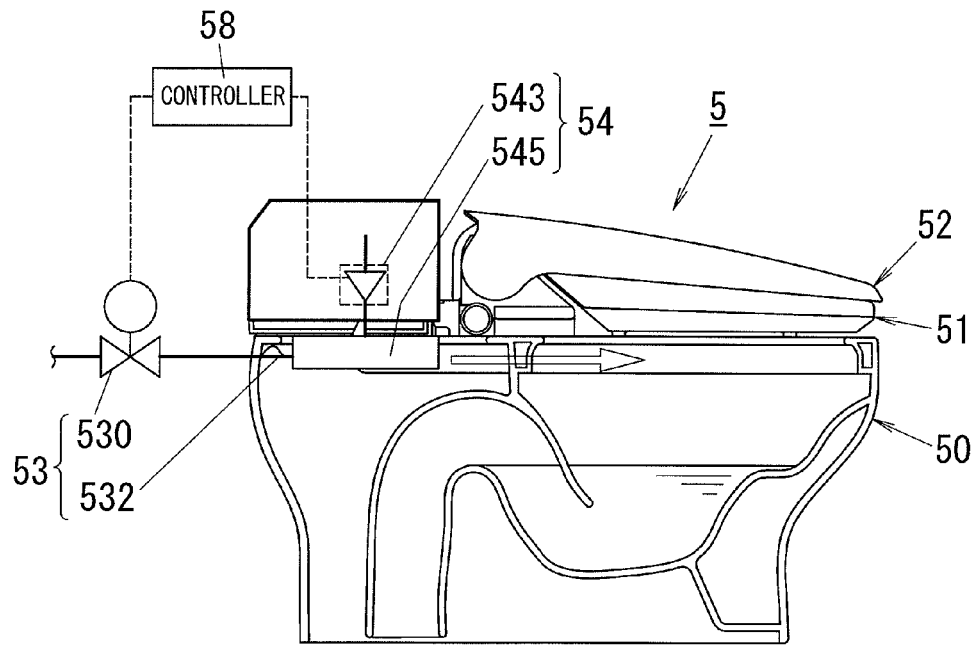
FIG. 17 is a schematic diagram of a fifth embodiment according to the present invention.

FIG. 17 shows a fifth embodiment according to the present invention (i.e., flush toilet equipment 5). The equipment 5 has: a toilet bowl 50; a seat 51; a seat cover 52; and a flush mechanism 53 formed of a water supply valve 530 and a flush water passage 532, in the same way as those of the embodiment of FIG. 10. In addition, according to an aspect, the equipment 5 further has a minute bubble generator 54 and a controller (bubble diameter controller) 58. The generator generates gas that is mm-order in size as well as minute bubbles that are μm-order in size.

The minute bubble generator 54 is formed of a gas mixer 543 and a sudden pressure change part 545 as a shear part. The generator is different from the structure of FIG. 10 in that it supplies gas to the top of the shear part (sudden pressure change region) in the sudden pressure change part 545.

Figure 18:
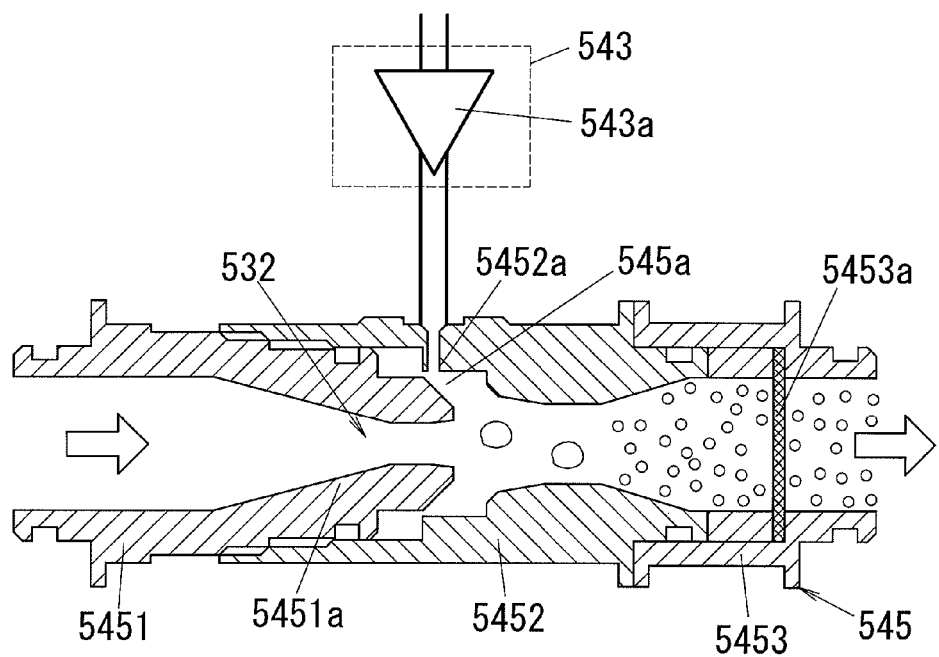
FIG. 18 is a sectional view of a sudden pressure change part in the fifth embodiment.

That is, the sudden pressure change part 545 includes a venturi tube like the sudden pressure change part 345. Specifically as shown in FIG. 18, the sudden pressure change part 545 is formed of an inlet part 5451, a shear part 5452, and an outlet part 5453. The inlet part 5451 has a restriction 5451a at the outlet side like FIG. 13. The inlet part 5451 and shear part 5452 are mutually coupled so that the inlet side of the shear part 5452 covers the circumferential part of the restriction 5451a. The shear part 5452 is a venturi tube similar to FIG. 8. The gas from the gas mixer 543 is supplied to the top of the shear part 5452 (the inside of the flush water passage 532) through the hole 5452a formed at the lateral part of the inlet side of the shear part 5452. The outlet part 5453 has a mesh (flow regulation part) 5453a like the enhanced embodiment of said embodiments. A cavity (gap) 545a extending outward is also formed between the inlet side of the shear part 5452 and the circumferential part. This cavity 545a generates negative pressure by means of the water flowing through the flush water passage 532, and efficiently mixes the gas from the gas mixer 543 with the water flowing through the passage 532 by means of the ejector effect.

Figure 19:
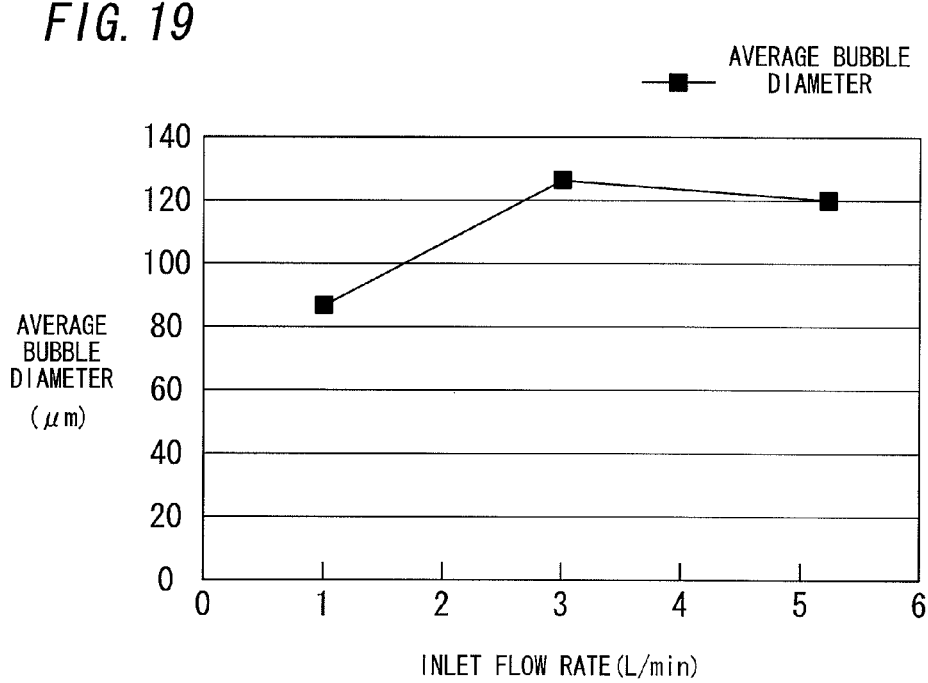
FIG. 19 is a characteristic graph used for the fifth embodiment.

The controller 58 is formed of, for example, a micon (microcomputer), a storage device and son on, and performs various controls such as open and close control of each of the water supply valve 530 and the valve 543a of the gas mixer 543, etc. Specifically, in case of toilet flush (flush and discharge operations), the controller 58 opens the valves 530 and 543a so that a gas supply amount becomes a predetermined first amount. After the toilet flush (in case of a water storage operation after siphon activation), the controller 58 adjusts each output (valve travel) of the valves 530 and 543a so that a gas supply amount becomes a predetermined second amount, and closes the valves 530 and 543a after a given time. In other words, the controller 58 controls based on the characteristic shown in FIG. 19. In case of toilet flush, the controller controls each output of the valves 530 and 543a so that diameters of bubbles included in flush water are larger diameters (millimeter order) than minute bubbles. Also, in case that the water from the mechanism 53 is stored in the bowl 50 after the toilet flush, the controller controls each output of the valves 530 and 543a so that bubbles included in flush water become the minute bubbles smaller than the bubbles of the millimeter order. That is, the first amount is larger than the second amount.

The effects described in the first embodiment are obtained in case that diameters of minute bubbles are less than approximately 200 μm. Also, in case that diameters of minute bubbles are less than approximately 50 μm, the minute bubbles can be retained long in the bowl 50, and dirt removal and dirt prevention effects can be continued longer. On the other hand, in case that bubbles of millimeter order (preferably 1-5 mm) are included in flush water, microscopic flow rate change becomes large and also bubbles are easy to burst, and therefore dirt stuck to the bowl 50 can be effectively flushed. Since bubbles also change, usage feel of a user can be improved.

Figure 20:
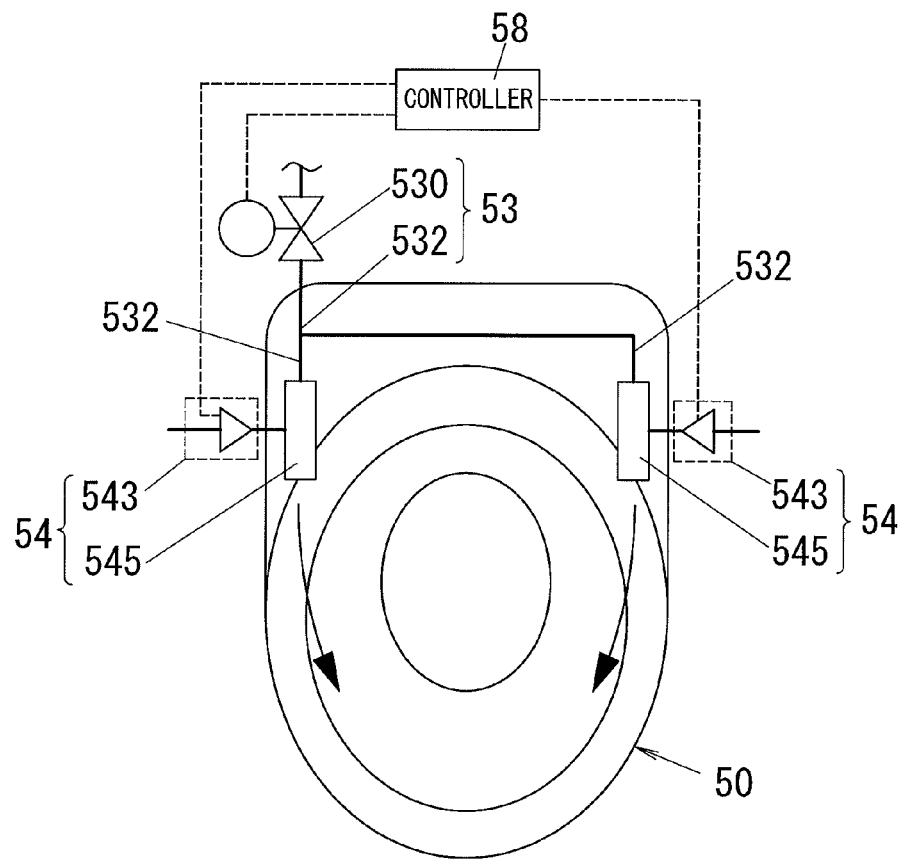
FIG. 20 is a schematic diagram of a modified embodiment.

In a modified embodiment, as shown in FIG. 20, the flush toilet equipment 5 has a pair of flush water passages 532 and 532 at the lower stream side of the water supply valve 530. The equipment further has a pair of minute bubble generators 54 and 54 located at the passages 532 and 532, respectively. The generators 54 and 54 mainly flush the left and right of the bowl 50. However, not limited to this, the equipment 5 may have at least three pairs of flush water passages and minute bubble generators.

In addition, the equipment 5 having the pairs of flush water passages and minute bubble generators may generate bubbles of millimeter order through one minute bubble generator, and generate minute bubbles through other minute bubble generators. In this case, since flush water including bubbles of millimeter order and minute bubbles is supplied into the bowl 50, said both effects can be displayed at once. Also, said chemical liquid injector may be further provided.

Figure 21:
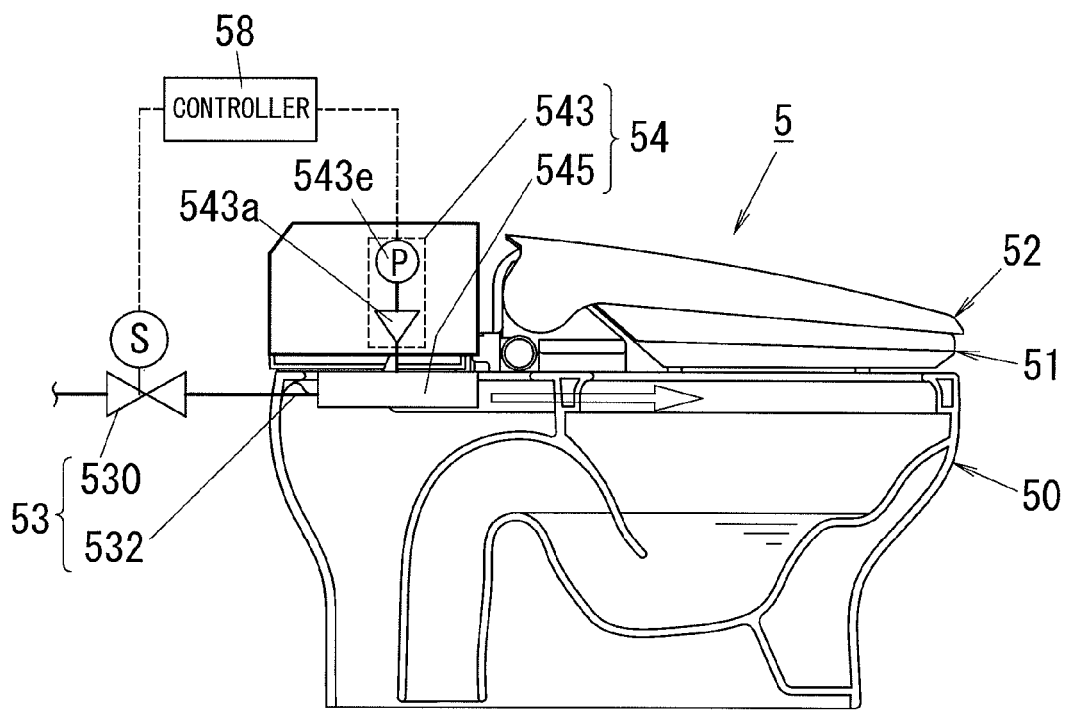
FIG. 21 is a schematic diagram of an alternate embodiment.

In an alternate embodiment, as shown in FIG. 21, the flush toilet equipment 5 further has an air pump 543e at the input side of the gas mixer 543 of the minute bubble generator 54. The controller 58 controls the output of the pump 543e instead of the valves 530 and 543a. The valve 543a of this embodiment is a non-return valve. In this equipment 5, diameters of bubbles included in flush water can be controlled by adjusting only the output of the air pump 543e irrespective of flow speed in the flush water passage 532, and accordingly the control becomes easy. Gas supply amount can be also correctly adjusted.

Figure 22:
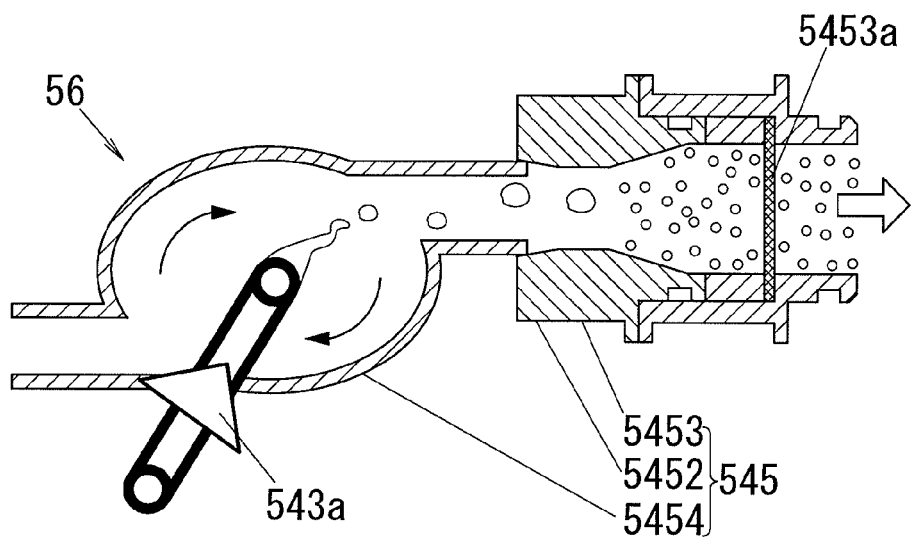
FIG. 22 is a sectional view of a sudden pressure change part in an alternate embodiment.

In an alternate embodiment, as shown in FIG. 22, the sudden pressure change part 545 of the flush toilet equipment 5 has a vortex generator 5454 instead of the inlet part 5451. The generator 5454 rotates the water from the water supply line, and also supplies the gas from the valve 543a to the neighborhood of rotation center of the rotated water. Since negative pressure is generated in the neighborhood of rotation center of the water, the gas from the valve 543a can be preferably mixed with the water from the water supply line through the ejector effect obtained from the negative pressure. The equipment can be simplified because no air pump is required.

Figure 23:
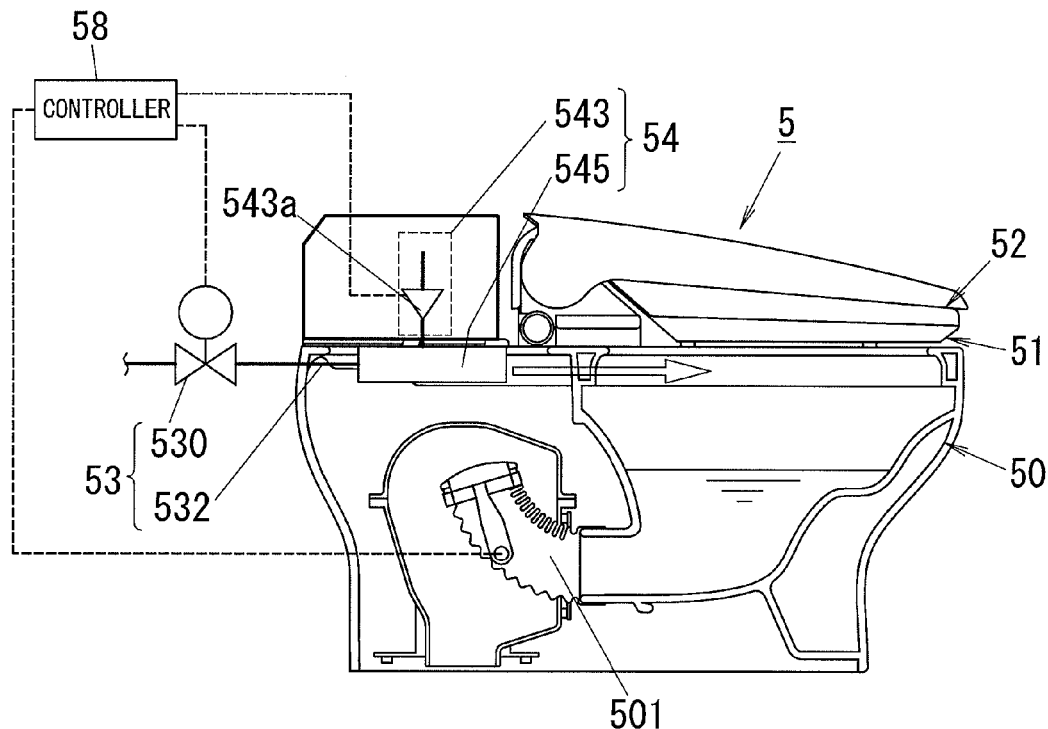
FIG. 23 is a schematic diagram of another enhanced embodiment.

In another enhanced embodiment, as shown in FIG. 23, the bowl 50 of the flush toilet equipment 5 has a turnable turn-trap 501 instead of the trap 101. When starting a discharge operation, the controller 58 turns the outlet of the turn-trap 501 to the downside. When finishing the discharge operation, the controller turns and returns the outlet of the turn-trap 501 to the upside. In case of this embodiment, the flush water operation (flush and discharge operations) and dirt prevention operation (water storage operation) can be clearly divided without waste. In addition, higher water saving effect can be obtained by employing the turn-trap. This turn-trap can be applied to each embodiment of the other.

Figure 24:
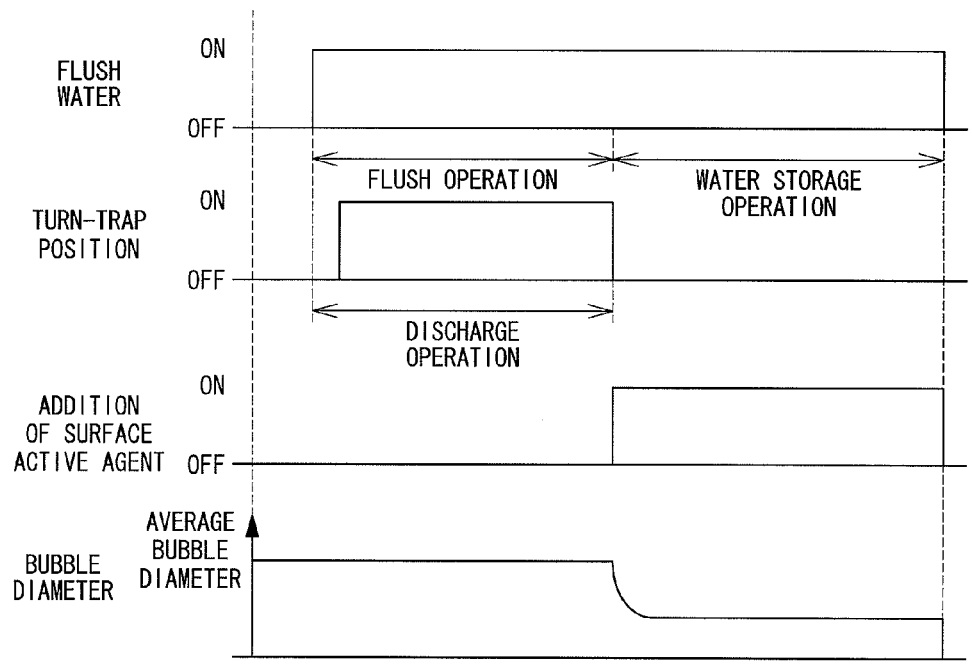
FIG. 24 is an explanatory diagram of operation of a modified embodiment.

Moreover, this flush toilet equipment 5 may further have a chemical liquid injector in the same way as that of the fourth embodiment. As shown in FIG. 24, in case of the flush and discharge operations, the controller 58 controls the valve 543a so that the valve travel becomes large; turns the water supply valve 530 on (open); and turns the outlet of the turn-trap 501 to the downside. Thereby, comparatively large bubbles (e.g., approx. 1-3 mm in average diameter) can be produced and then included in flush water. In case of the water storage operation after a given time, the controller 58 turns the outlet of the turn-trap 501 to the upside and injects e.g., the surface active agent into flush water from the chemical liquid injector. The controller also controls the valve 543a so that the valve travel becomes small. Thereby, minute bubbles (e.g., approx. 50 μm in average diameter) can be produce and then included in flush water.

Figure 25:
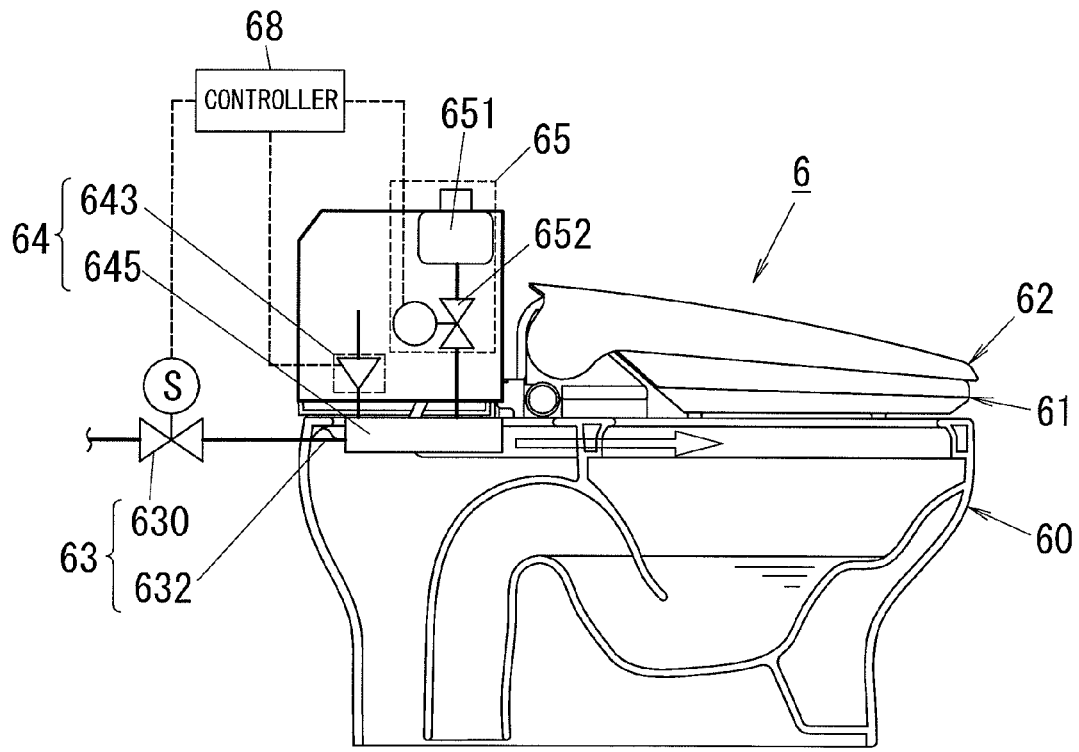
FIG. 25 is a schematic diagram of a sixth embodiment according to the present invention.
Figure 26:
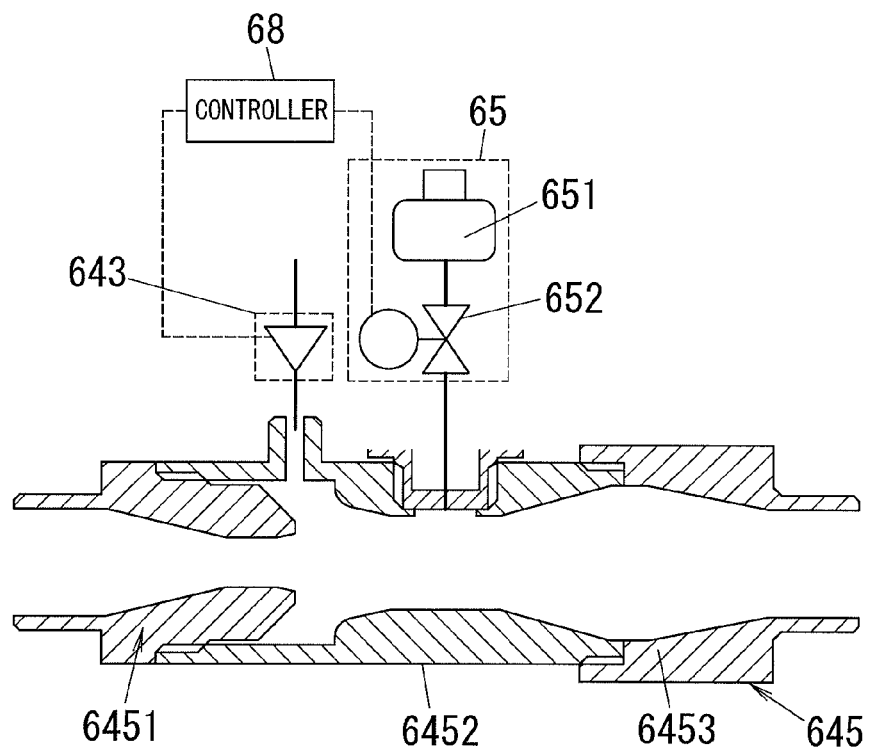
FIG. 26 is a sectional view of a sudden pressure change part in the sixth embodiment.

FIG. 25 shows a sixth embodiment according to the present invention (i.e., flush toilet equipment 6). The equipment 6 has: a toilet bowl 60; a seat 61; a seat cover 62; a flush mechanism 63 formed of a water supply valve 630 and a flush water passage 632; and a minute bubble generator 64 formed of a gas mixer 643 and a sudden pressure change part 645 as a shear part, in the same way as those of the fifth embodiment. As shown in FIG. 26, the sudden pressure change part 645 is formed, like that of the fifth embodiment, of an inlet part 6451, a shear part 6452 and an outlet part 6453, but the outlet part 6453 has a restriction (flow regulation part) instead of the mesh.

Figure 27:
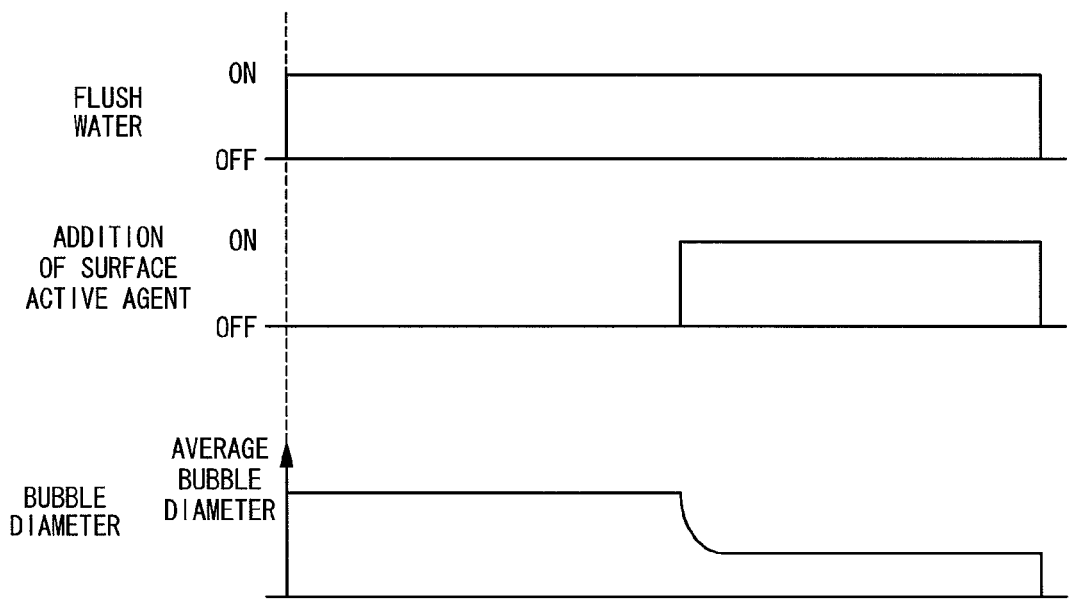
FIG. 27 is an explanatory diagram of operation of the sixth embodiment.

In addition, according to an aspect, the equipment 6 has a chemical liquid injector 65 and a controller 68. The chemical liquid injector 65 is formed of a tank 651 storing a chemical liquid (e.g., surface active agent), and a chemical liquid supply valve 652 located at the outlet of the tank 651. The injector injects a given amount of chemical liquid into the shear part 6452 through the hole at the center of the lateral part of the part 6452. The output of the valve 652 is coupled to the hole at the center of the lateral part of the part 6452, and thereby capable of employing the ejector effect obtained from negative pressure in the shear part 6452. Accordingly, the equipment can be simplified. As shown in FIG. 27, in case of the water storage operation, the controller 68 controls the open and close of the valve 652 so that the injected amount of the chemical liquid is adjusted. In case of this equipment 6, the effects similar to the fourth embodiment can be further obtained. It is possible to especially enhance flush effect with respect to oil content of dirt. The surface of the water in the bowl 60 can be also covered with a layer of minute bubbles, and accordingly the minute bubbles can be is held for a long time. Still more, one of the surface active agent and the aroma may be injected.

Figure 28:
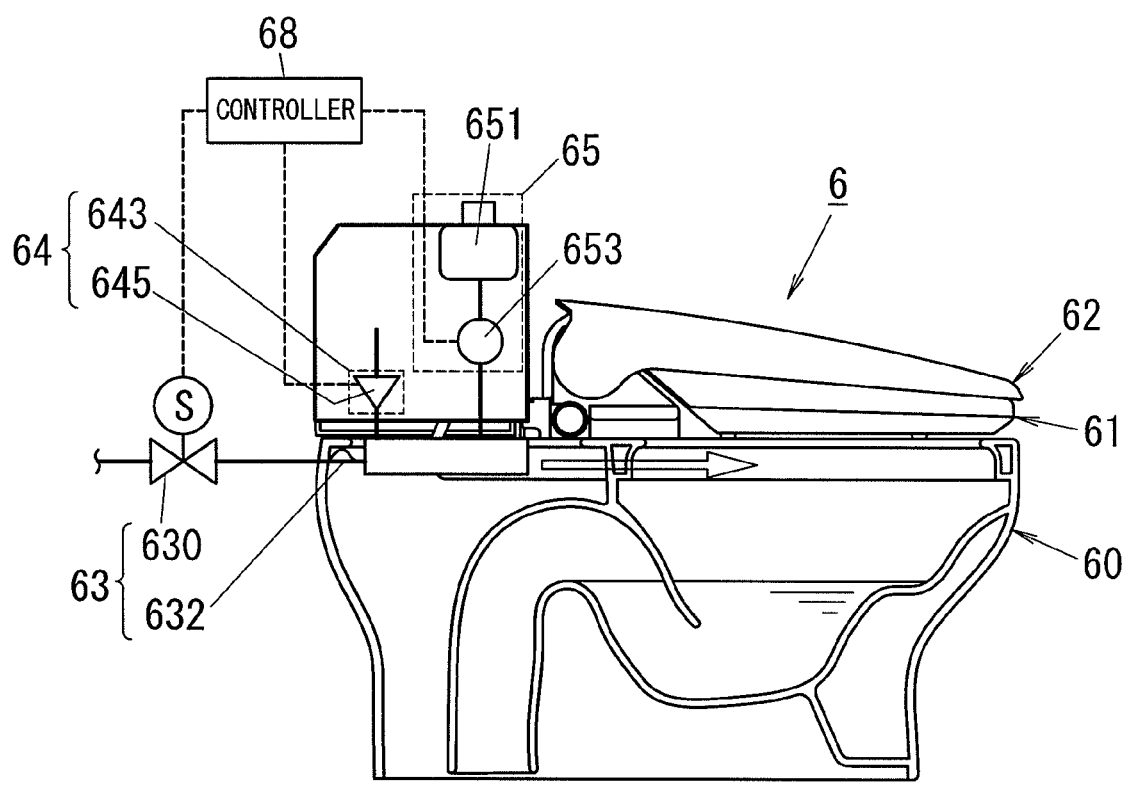
FIG. 28 is a schematic diagram of an alternate embodiment.

In an alternate embodiment, as shown in FIG. 28, the chemical liquid injector 65 of the flush toilet equipment 6 has a pump 653 instead of the chemical liquid injector valve 652. The controller 68 controls the output of the pump 653 instead of control of the valve 652.

Figure 29:
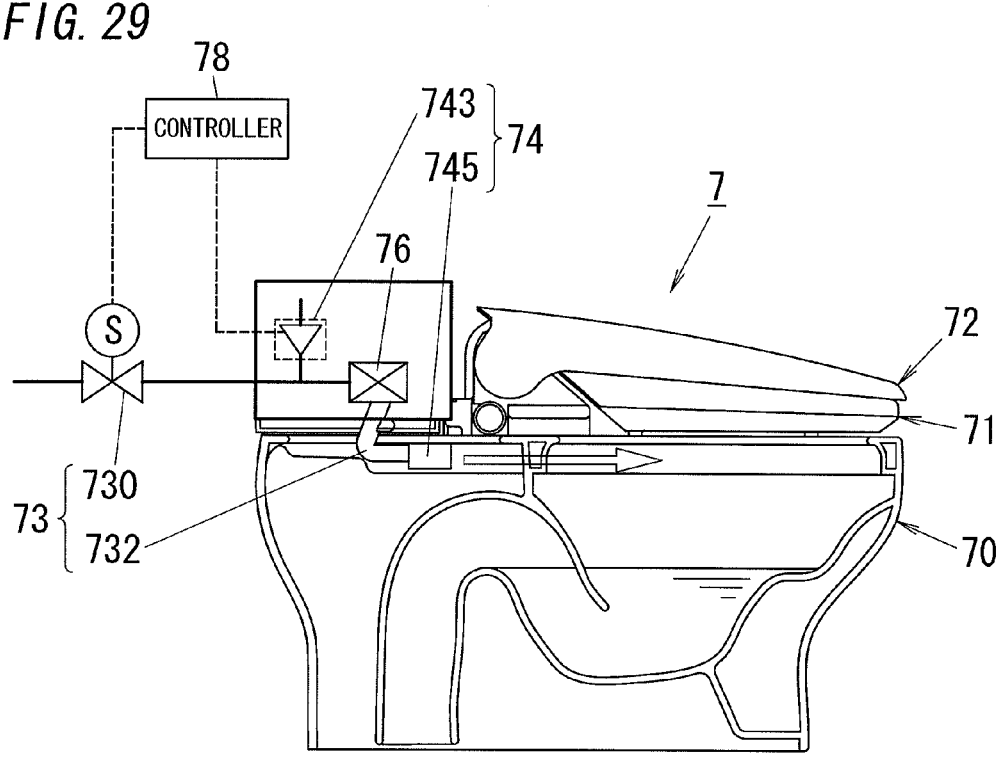
FIG. 29 is a schematic diagram of a seventh embodiment according to the present invention.

FIG. 29 shows a seventh embodiment according to the present invention (i.e., flush toilet equipment 7). The equipment 7 has: a toilet bowl 70; a seat 71; a seat cover 72; a flush mechanism 73 formed of a water supply valve 730 and a flush water passage 732; a minute bubble generator 74 formed of a gas mixer 743 and a sudden pressure change part 745 as a shear part; and a controller 78, in the same way as those of the embodiment of FIG. 10 or the sixth embodiment. In addition, according to an aspect, the equipment 7 has a sterilizer 76.

Figure 30:
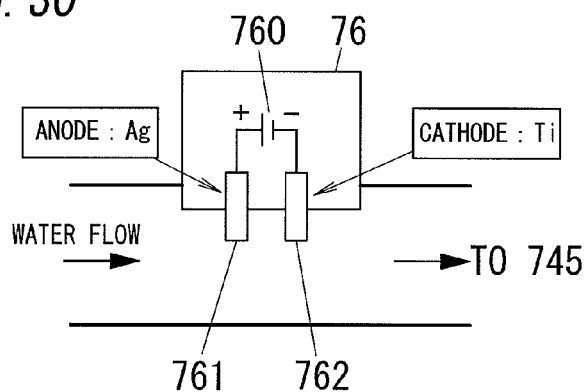
FIG. 30 is a schematic diagram of a sterilizer in the seventh embodiment.
Figure 31:
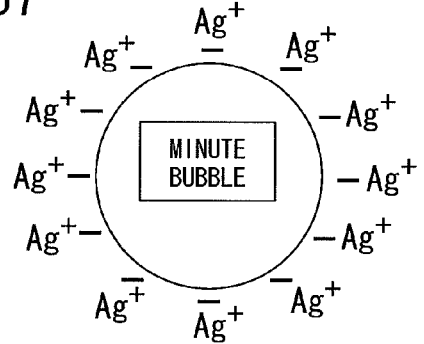
FIG. 31 is an explanatory diagram of antibacterial effect, etc. of the seventh embodiment.

As shown in FIG. 30, the sterilizer 76 has a power source 760, an anode 761 made of Ag and a cathode 762 made of Ti. The sterilizer puts each one end of the anode 761 and cathode 762 in the water flowing between the gas mixer 743 and sudden pressure change part 745, and adds silver ions to flush water. In case of this construction, as shown in FIG. 31, the silver ions that are metal ions with antibacterial activity cover the minute bubbles bearing negative charges. On the other hand, since the interfaces of the minute bubbles have affinity with hydrophobic surface, the minute bubbles easily stick to cells' surfaces having lipid and hydrophobic property. Accordingly, by supplying the inside of the bowl 70 with flush water including the minute bubbles covered with silver ions, sterilization and antibacterial effects can be obtained and the toilet can be kept clean.

In an alternate embodiment, instead of silver ions, the sterilizer 76 adds metal ions such as copper, zinc or the like having antibacterial activity to flush water. Also in this embodiment, sterilization and antibacterial effects can be obtained and the toilet can be kept clean.

Figure 32:
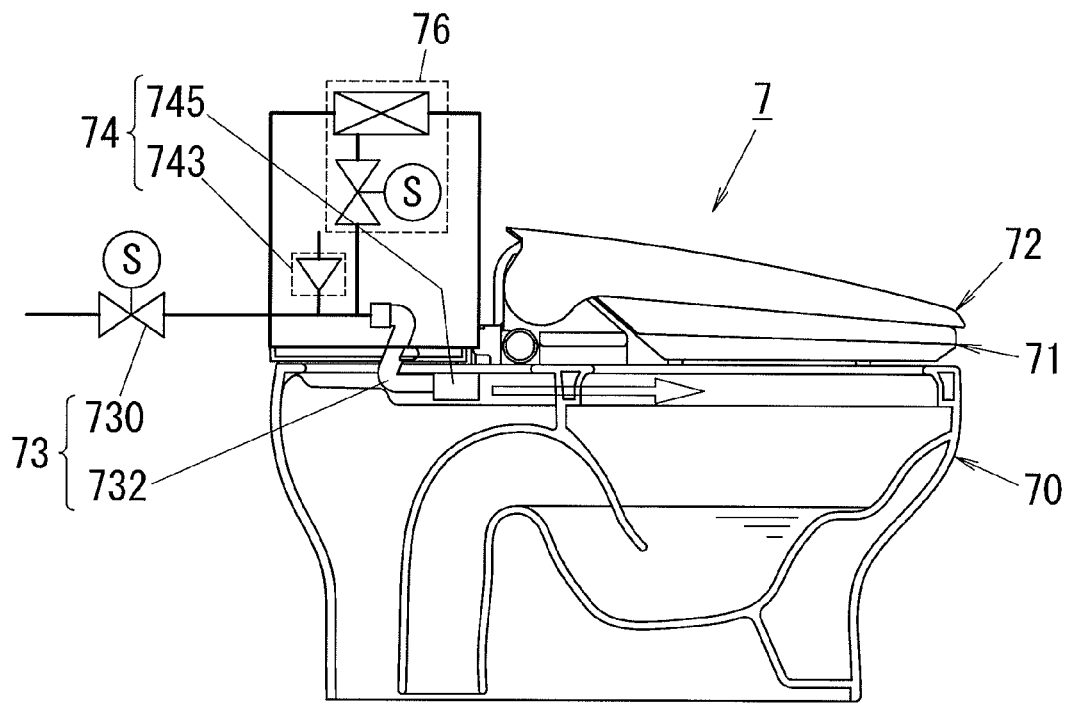
FIG. 32 is a schematic diagram of an alternate embodiment.
Figure 33:
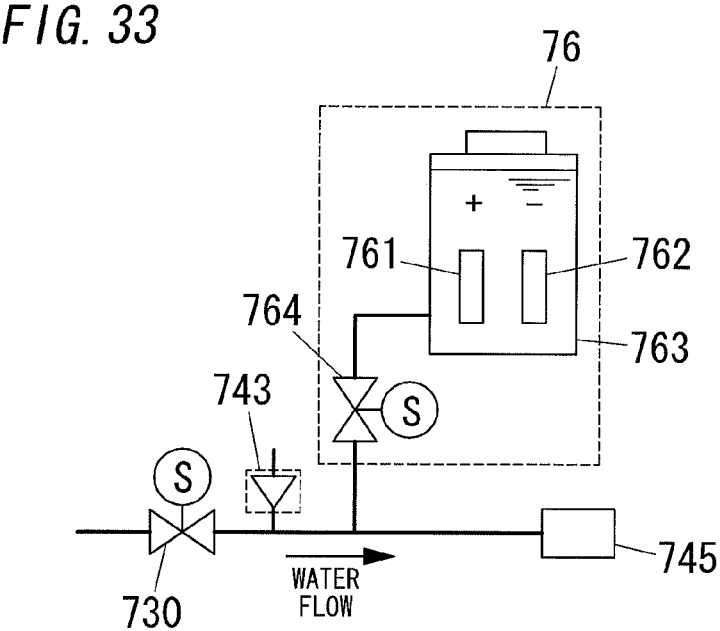
FIG. 33 is a schematic diagram of a sterilizer in the embodiment.

In an alternate embodiment, as shown in FIGS. 32 and 33, the flush toilet equipment 7 is made up of a power supply (not shown), a pair of conventional electrodes 761 and 762, an NaCl solution tank 763, and a solenoid valve 764 coupled with the outlet of the solution tank 763. In stead of silver ions, the equipment adds free chlorine to the water flowing between the gas mixer 743 and the sudden pressure change part 745. Thus, free chlorine is added to flush water and thereby sterilization and antibacterial effects can be obtained and the toilet can be kept clean. Incidentally, the reaction in the solution tank 763 is as follows.

ANODE: $2Cl^- \rightarrow Cl_2 + 2e$

CATHODE: $H_2O + 2e \rightarrow H_2 + 2OH^-$

Figure 34:
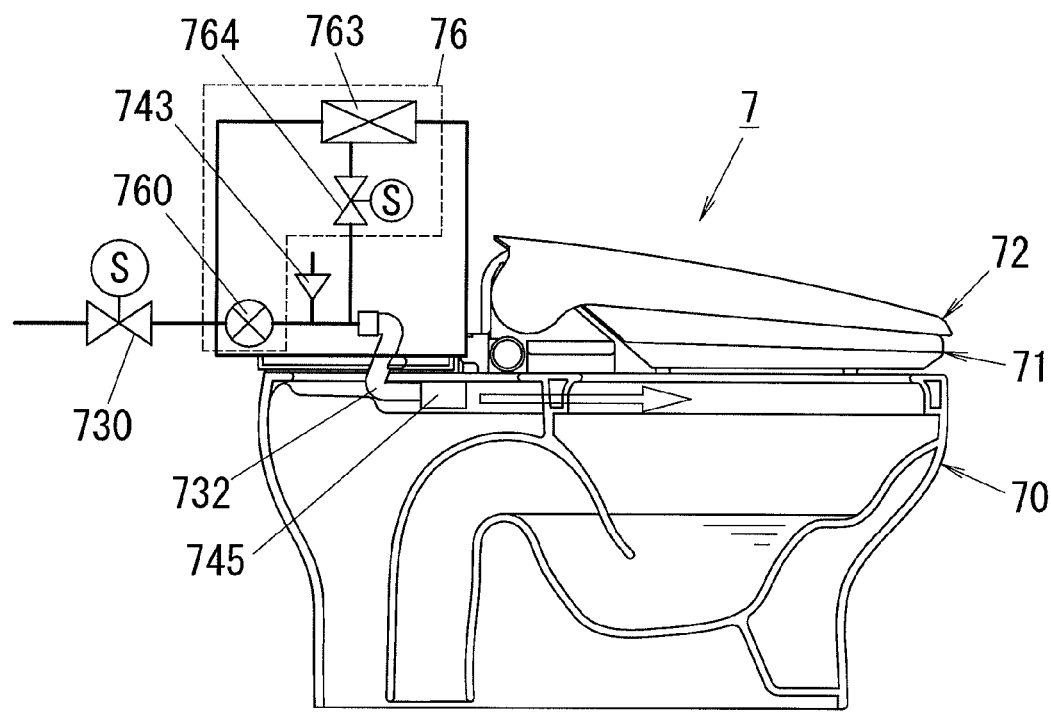
FIG. 34 is a schematic diagram of a preferred embodiment.
Figure 35:
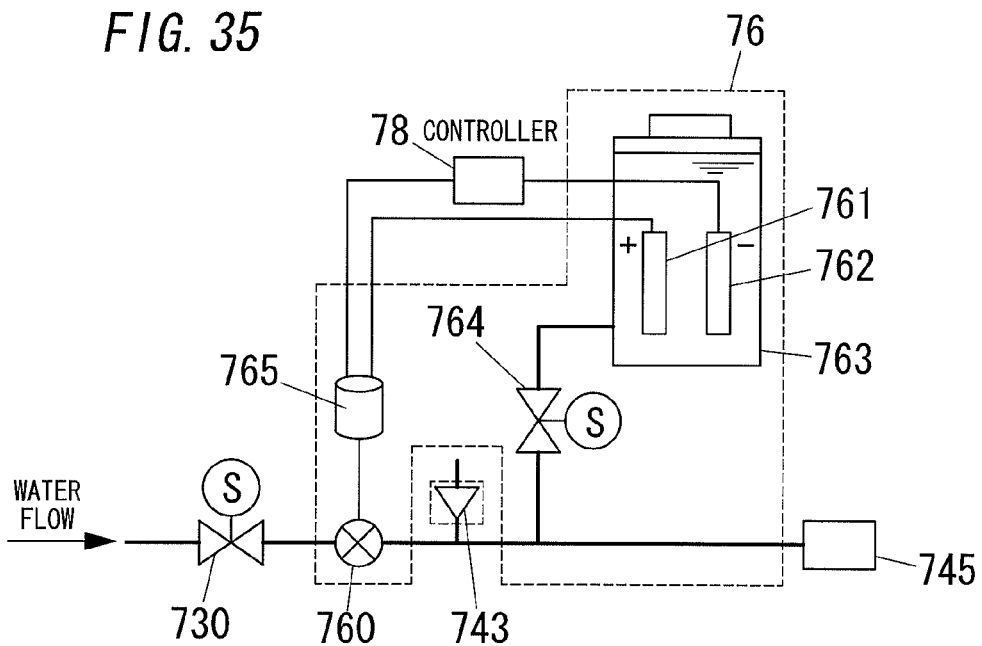
FIG. 35 is a schematic diagram of a modified embodiment.
Figure 36:
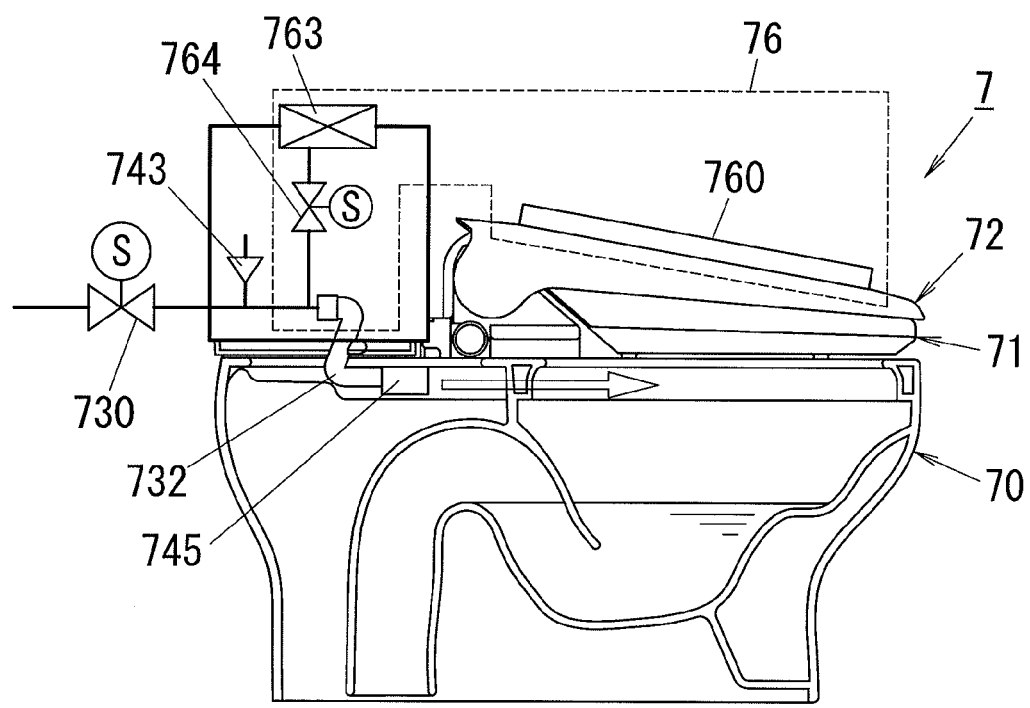
FIG. 36 is a schematic diagram of another modified embodiment.

LIQUID PHASE: $2NaCl + 2H_2O \rightarrow 2NaOH + Cl_2 + H_2 \rightarrow NaClO + NaCl + H_2O + H_2 NaClO + H_2O \rightarrow / \leftarrow HClO + NaCl\ Cl_2 + H_2O \rightarrow / \leftarrow HClO + H^+ + Cl^-\ HClO \rightarrow / \leftarrow ClO^- + H^+ + Cl^-$ In a preferred embodiment, as shown in FIG. 34, the flush toilet equipment 7 has a water-power generator as the power source 760 of the sterilizer 76. In addition, as shown in FIG. 35, the equipment 7 may have a condenser 765 and a controller 78 between the power source 760 and the electrodes 761 and 762. The controller 78 may supply the electrodes 761 and 762 with the electric power of the condenser 765, charged by the power source 760. Moreover, as shown in FIG. 36, the equipment 7 may have a photovoltaic power generation panel as the power source 760 of the sterilizer 76. In any of these constructions, saving energy effect can be obtained.

Although the present invention has been described with reference to certain preferred embodiments, numerous modifications and variations can be made by those skilled in the art without departing from the true spirit and scope of this invention.

The invention claimed is:

1. Flush toilet equipment, comprising:
   a bowl;
   a flush mechanism that supplies flush water to the bowl through a flush water passage;
   a minute bubble generator that generates minute bubbles and bubbles of millimeter order, the minute bubbles being 0.1-1000 μm in bubble diameter and mixed with the flush water, diameters of the bubbles of millimeter order being larger than those of the minute bubbles and mixed with the flush water; and
   a controller that controls the generator so that bubbles mixed with the flush water become the bubbles of millimeter order in case of toilet flush, and also controls the generator so that bubbles included in the flush water become the minute bubbles in case water is stored in the bowl.

2. The flush toilet equipment of claim 1, wherein
   the generator includes a sudden pressure change part that generates the minute bubbles by suddenly changing the pressure of water that is water from a water supply line and includes gas from another line;
   wherein the flush toilet equipment further comprises a bubble diameter controller that controls the generator to adjust diameters of bubbles included in the flush water;
   wherein the bowl drains water in case of toilet flush and puts therein water from the mechanism after the toilet flush;
   wherein the generator comprises a gas mixer that mixes the gas from said another line with the water from the water supply line to supply gas-mixed water to the sudden pressure change part side; and
   wherein the controller adjusts the diameters of bubbles included in the flush water by adjusting quantity of the gas mixed with the water from the water supply line.

3. The flush toilet equipment of claim 2, wherein:
   the generator further comprises a vortex generator that rotates the water from the water supply line to the sudden pressure change part side; and
   the gas mixer supplies the gas from said another line to the neighborhood of the rotation center of the water rotated through the vortex generator.

4. The flush toilet equipment of claim 3, further comprising at least one of a chemical liquid injector and a sterilizer that are located between the water supply line and the sudden pressure change part.

5. The flush toilet equipment of claim 2, wherein:
   the generator further comprises an air pump located between the water supply line and the gas mixer; and
   the controller adjusts the diameters of bubbles included in the flush water by adjusting output of the air pump to adjust quantity of the gas mixed with the water from the water supply line.

6. The flush toilet equipment of claim 5, further comprising at least one of a chemical liquid injector and a sterilizer that are located between the water supply line and the sudden pressure change part.

7. The flush toilet equipment of claim 2, further comprising at least one of a chemical liquid injector and a sterilizer that are located between the water supply line and the sudden pressure change part.

8. The flush toilet equipment of claim 1, wherein diameters of the minute bubbles are in the range of 0.1-200 μm.

9. The flush toilet equipment of claim 1, further comprising at least one of a chemical liquid injector and a sterilizer that are located between the water supply line and the sudden pressure change part.

10. The flush toilet equipment of claim 1, wherein diameters of the bubbles of millimeter order are in the range of 1-5 mm.

* * * * *